US012681164B2

(12) United States Patent
Koo et al.

(10) Patent No.: US 12,681,164 B2
(45) Date of Patent: Jul. 14, 2026

(54) METHOD AND DEVICE FOR PROVIDING SERVICE USING UWB COMMUNICATION

(71) Applicant: Samsung Electronics Co., Ltd., Suwon-si (KR)

(72) Inventors: Jonghoe Koo, Suwon-si (KR); Youngwan So, Suwon-si (KR); Mingyu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 363 days.

(21) Appl. No.: 18/349,507

(22) Filed: Jul. 10, 2023

(65) Prior Publication Data

US 2024/0012133 A1 Jan. 11, 2024

(30) Foreign Application Priority Data

Jul. 11, 2022 (KR) ........................ 10-2022-0085321

(51) Int. Cl.
*G01S 13/76* (2006.01)
*G01S 13/02* (2006.01)
(Continued)

(52) U.S. Cl.
CPC ........ *G01S 13/765* (2013.01); *G01S 13/0209* (2013.01); *G01S 13/876* (2013.01); *H04B 1/7163* (2013.01)

(58) Field of Classification Search
CPC .. G01S 13/765; G01S 13/0209; G01S 13/876; H04B 1/7163
See application file for complete search history.

(56) References Cited

U.S. PATENT DOCUMENTS

| | | | |
|---|---|---|---|
| 12,352,879 B1 * | 7/2025 | Padaki | ...................... G01S 3/46 |
| 2003/0214967 A1 * | 11/2003 | Heberling | ............. H04W 24/00 |
| | | | 370/437 |

(Continued)

FOREIGN PATENT DOCUMENTS

WO        2022/039354 A1      2/2022

OTHER PUBLICATIONS

F. Bonafini, P. Ferrari, A. Flammini, S. Rinaldi and E. Sisinni, "Exploiting Time Synchronization as Side Effect in UWB Real-Time Localization Devices," 2018 IEEE International Symposium on Precision Clock Synchronization for Measurement, Control, and Communication (ISPCS), Geneva, Switzerland, 2018, (Year: 2018).*

(Continued)

*Primary Examiner* — Resha Desai
*Assistant Examiner* — Peter Davon Doze
(74) *Attorney, Agent, or Firm* — Jefferson IP Law, LLP

(57) ABSTRACT

A method for providing a service through ultra-wide band (UWB) communication is provided. The method by a UWB device includes receiving, from an initiator anchor, a first UWB message initiating a ranging procedure, receiving, from a plurality of responder anchors, a plurality of second UWB messages transmitted in response to the first UWB message, receiving, from the initiator anchor, a third UWB message transmitted in response to the second UWB message, receiving, from the plurality of responder anchors, a plurality of fourth UWB messages transmitted in response to the third UWB message, and performing downlink time difference of arrival (DL-TDoA)-based localization based on the first UWB message, the second UWB message, the third UWB message, and the fourth UWB message.

20 Claims, 23 Drawing Sheets

(51) Int. Cl.
    *G01S 13/87*     (2006.01)
    *H04B 1/7163*     (2011.01)

(56)           References Cited

U.S. PATENT DOCUMENTS

| | | | |
|---|---|---|---|
| 2008/0186231 A1 | 8/2008 | Aljadeff et al. | |
| 2016/0178727 A1 | 6/2016 | Bottazzi | |
| 2018/0310133 A1 | 10/2018 | Ramasamy et al. | |
| 2020/0287959 A1* | 9/2020 | Li | H04W 48/16 |
| 2021/0377741 A1* | 12/2021 | De Perthuis | H04W 4/021 |
| 2022/0104166 A1* | 3/2022 | Schober | H04W 64/003 |
| 2022/0132021 A1 | 4/2022 | Kim et al. | |
| 2022/0167301 A1 | 5/2022 | Goyal et al. | |
| 2022/0210631 A1 | 6/2022 | Lee et al. | |
| 2024/0073851 A1* | 2/2024 | Yerramalli | H04W 64/00 |

OTHER PUBLICATIONS

International Search Report dated Oct. 11, 2023, issued in International Application No. PCT/KR2023/009848.
Ma et al.; Beacon and Ranging Frames to Support Downlink TDOA (DL-TDOA) Location Service in 802.15; Red Point Positioning; XP 68198185 A; Nov. 16, 2021.
Extended European Search Report dated Oct. 17, 2025; European Appln. No. 23839928.1-1206 / 4548119 PCT/KR2023009848.

* cited by examiner

Figure 3:
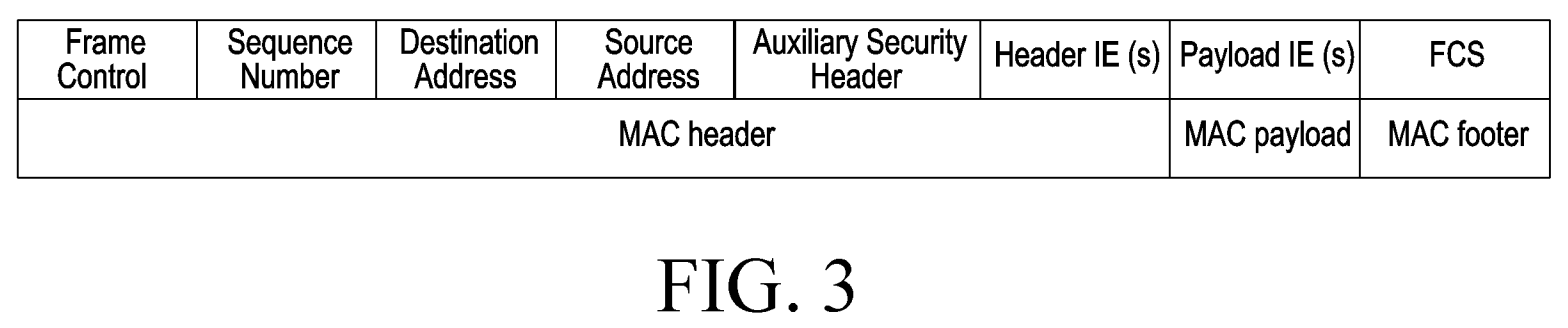

| Frame Control | Sequence Number | Destination Address | Source Address | Auxiliary Security Header | Header IE (s) | Payload IE (s) | FCS |
|---|---|---|---|---|---|---|---|
| MAC header | | | | | | MAC payload | MAC footer |

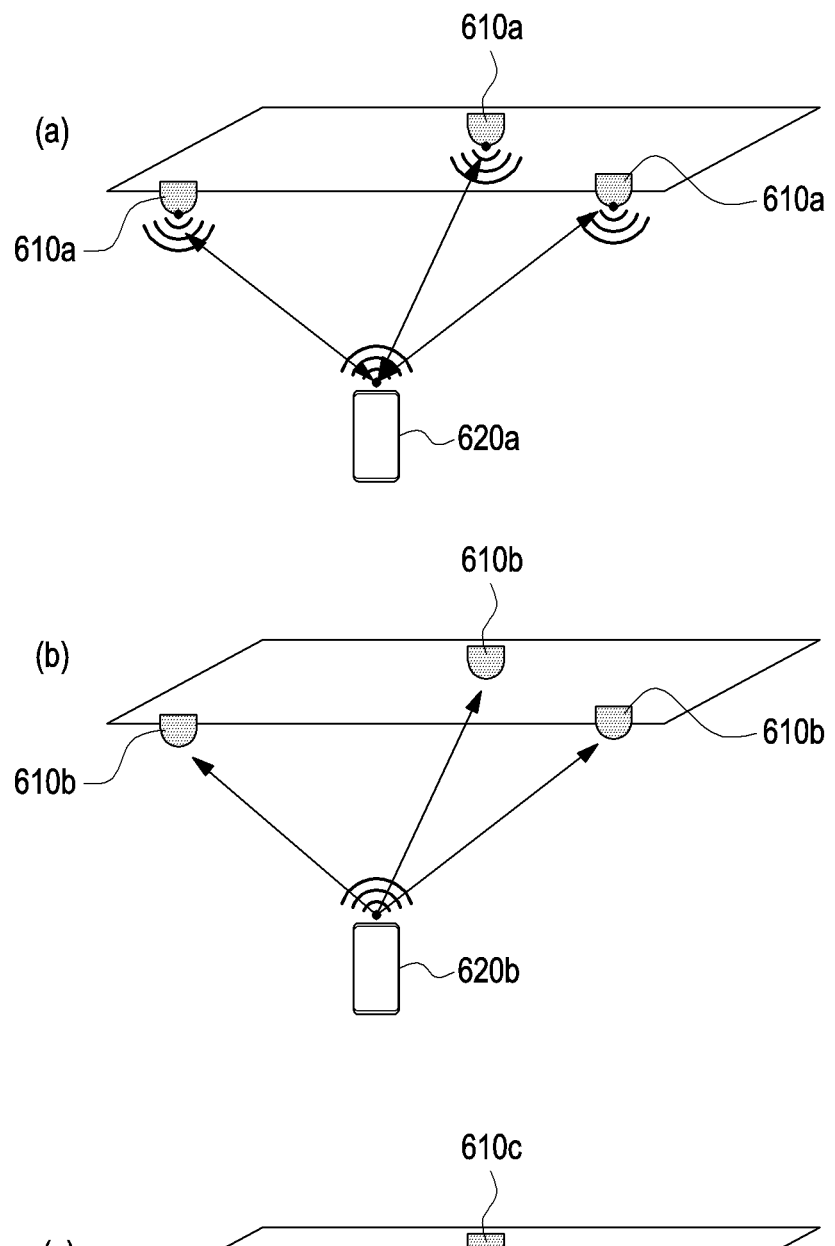
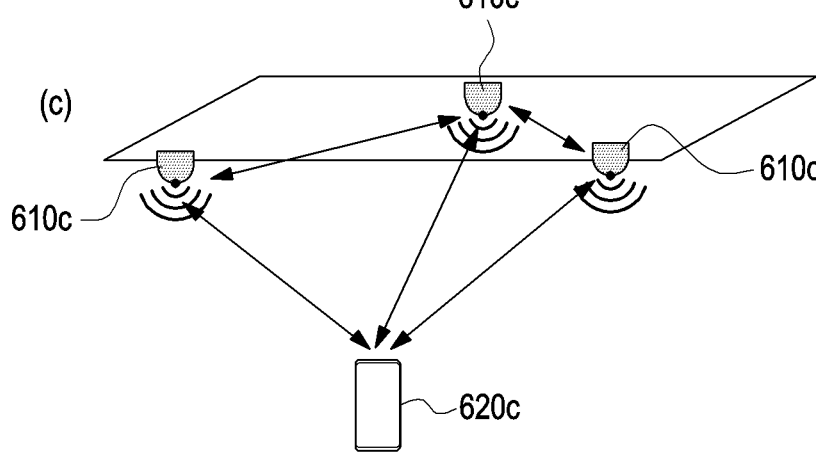
FIG. 6

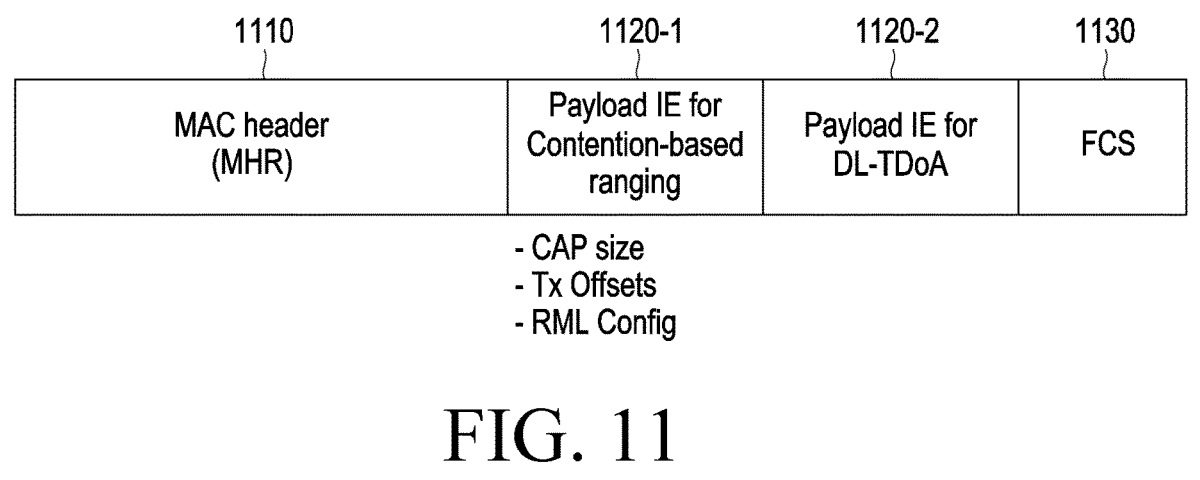

| 1110 | 1120-1 | 1120-2 | 1130 |
|---|---|---|---|
| MAC header (MHR) | Payload IE for Contention-based ranging | Payload IE for DL-TDoA | FCS |

- CAP size
- Tx Offsets
- RML Config

FIG. 11

| Parameter | Size (bits) | Notes |
|---|---|---|
| Vendor OUI | 24 | 0x5A18FF |
| UWB Message ID | 4 | 0x3= Control Message |
| RFU | 4 | Reserved For Future set to '0' |
| Message Control | 24 | Message Control field |
| Stride Length | 16 | Number of blocks to be skipped<br>If the value is 0x00 then Block Striding is not used |
| RML Size | 0/16 | Size of the RML in octets |
| Responder Management List (RML) | Variable | This list contains the Device MAC Address of the known Responder(s). |
| Vendor OUI | 24 | 0x5A18FF |
| UWB Message ID | 4 | 0x7= OWR Message |
| OWR Message Type | 4 | 0x0: Blink UTM<br>0x1: Synchronization UTM<br>0x2: Poll DTM<br>0x3: Response DTM<br>0x4: Final DTM<br>0x5: AoA Advertisement<br>0x6-0xF: RFU |
| OWR Message Type-dependent Payload | X | This field shall follow the specification under respective OWR Message Type Payload IE fields defined in the following subsections.<br>0x0--0x1: Section 5.9.9.1.<br>0x2--0x4: Section 5.9.9.2.<br>0x5: Section 5.9.9.3. |

The first group (rows Vendor OUI through Responder Management List) is labeled 1220-1. The second group (rows Vendor OUI through OWR Message Type-dependent Payload) is labeled 1220-2.

FIG. 12A

| Parameter | Size (bits) | Notes |
|---|---|---|
| Vendor OUI | 24 | 0x5A18FF |
| UWB Message ID | 4 | 0x7= OWR Message |
| OWR Message Type | 4 | 0x0: Blink UTM<br>0x1: Synchronization UTM<br>0x2: Poll DTM<br>0x3: Response DTM<br>0x4: Final DTM<br>0x5: AoA Advertisement<br>0x6-0xF: RFU |
| OWR Message Type-dependent Payload | X | This field shall follow the specification under respective OWR Message Type Payload IE fields defined in the following subsections.<br>0x0--0x1: Section 5.9.9.1.<br>0x2--0x4: Section 5.9.9.2.<br>0x5: Section 5.9.9.3. |
| Vendor OUI | 24 | 0x5A18FF |
| UWB Message ID | 4 | 0x3= Control Message |
| RFU | 4 | Reserved For Future set to '0' |
| Message Control | 24 | Message Control field |
| Stride Length | 16 | Number of blocks to be skipped<br>If the value is 0x00 then Block Striding is not used |
| RML Size | 0/16 | Size of the RML in octets |
| Responder Management List (RML) | Variable | This list contains the Device MAC Address of the known Responder(s). |

1220-2 (brace spanning rows from Vendor OUI through OWR Message Type-dependent Payload)

1220-1 (brace spanning rows from Vendor OUI through Responder Management List (RML))

FIG. 12B

| Parameter | Size (bits) | Notes |
|---|---|---|
| Message Control | 24 | Configuration of the DTM as defined in Table X2. |
| Round Index | 8 | Round index of the current ranging round. |
| Block Index | 16 | Block index of the current ranging block. |
| TX Timestamp | 40/64 | DTM transmission timestamp represented as one of a local or a common time base. The TX timestamp shall be in units of $2^{-7}$ of the 499.2 MHz chipping period, approximately 15.65ps. |
| Responder DT-Anchor Management List | (0/24/32/40/72/80/88)*N | N Responder DT-Anchor Management List Elements as defined in Table X3. N is determined by the value of the Responder DT-Anchor Management List Length field in the Message Control field. Each Responder DT-Anchor Management List Element shall contain the Responder Address field and may contain the Ranging Slot Index field and the ToF Result field. |

FIG. 13A

| Parameter | Size (bits) | Notes |
|---|---|---|
| Ranging Slot Index | 0/8 | Assigned ranging slot |
| Second Ranging Slot Index | 0/8 | Second assigned ranging slot |
| ToF Result | 0/16 | ToF as a result of SS-TWR with the Responder DT-Anchor identified by Responder Address in units of $2^{-7}$ of the 499.2 MHz chipping period, approximately 15.65ps. |
| Responder Address | 16/64 | Address of Responder DT-Anchor |

FIG. 13B

| | SESSION_SET_INITIATOR_DT_ANCHOR_RR_RDM_LIST_CMD | |
|---|---|---|
| | Length | Value/ Description |
| | 4 Octets | Session ID of the DL-TDoA session in which RDM list of Initiator DT-Anchor has to be set for a given ranging round. |
| | 1 Octets | Number of RR_RDM within the RR_RDM_LIST field containing the ranging round indexes and corresponding DST_MAC_ADDRESS lists. |
| Ranging Round Index | 1 Octet | Ranging round index in which the DT- Anchor acts as the Initiator and whose DST_MAC_ADDRESS list has to be set. |
| Number of Destination MAC Addresses | 1 Octet | Number N of destination MAC addresses for the specified ranging round index. |
| Responder Slots | 1/N+1/2N+1 Octets | Responder slot indexes assigned for Responder Transmissions.<br><br>Octet 0: responder slot presence.<br>Possible Values:<br>0x00: responder slots are not present, therefore responder slots shall be implicitly obtained from the order of the DST_MAC_ADDRESS list below.<br>0x01: responder slots are present and therefore N octets shall follow, specifying the assigned slot for each Responder DT-Anchor.<br><br>Octets 1 to N: assigned slots for the Responder DT-Anchors in DST_MAC_ADDRESS list below<br><br>Octets N+1 to 2N+1: second assigned slots for the Responder DT-Anchors in DST_MAC_ADDRESS list below |
| DST_MAC_ADDRESS | 2/8*N Octets | DST_MAC_ADDRESS list for the specified ranging round. The MAC addressing mode indicator determines whether to use short or extended MAC addresses. |

Length (left column spanning rows): Variable; Depends on number of lists (M), MAC address format, and number of destination MAC addresses per list

FIG. 14

METHOD AND DEVICE FOR PROVIDING SERVICE USING UWB COMMUNICATION

CROSS-REFERENCE TO RELATED APPLICATION(S)

This application is based on and claims priority under 35 U.S.C. § 119(a) of a Korean patent application number 10-2022-0085321, filed on Jul. 11, 2022, in the Korean Intellectual Property Office, the disclosure of which is incorporated by reference herein in its entirety.

BACKGROUND

1. Field

The disclosure relates to ultra-wide band (UWB) communication. More particularly, the disclosure relates to a method and device for providing a service using UWB communication.

2. Description of Related Art

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. Implementing the IoT requires technical elements, such as sensing technology, a wired/wireless communication and network infrastructure, service interface and security technologies. A recent ongoing research for thing-to-thing connection is on techniques for sensor networking, machine-to-machine (M2M), or machine-type communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of conventional information technology (IT) techniques and various industries.

As wireless communication systems evolve to provide various services, a need arises for a method for effectively providing such services. For example, it is possible to use a ranging technique for measuring the distance between electronic devices using ultra-wide band (UWB).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for providing a service (e.g., payment service) through UWB communication.

Additional aspects will be set forth in part in the description which follows and, in part, will be apparent from the description, or may be learned by practice of the presented embodiments.

In accordance with an aspect of the disclosure, a method by a UWB device is provided. The method includes receiving, from an initiator anchor, a first UWB message initiating a ranging procedure, receiving, from a plurality of responder anchors, a plurality of second UWB messages transmitted in response to the first UWB message, receiving, from the initiator anchor, a third UWB message transmitted in response to the second UWB message, receiving, from the plurality of responder anchors, a plurality of fourth UWB messages transmitted in response to the third UWB message, and performing downlink time difference of arrival (DL-TDoA)-based localization based on the first UWB message, the second UWB message, the third UWB message, and the fourth UWB message.

In accordance with another aspect of the disclosure, a UWB device is provided. The UWB device includes a transceiver and a controller connected to the transceiver and configured to receive, from an initiator anchor, a first UWB message initiating a ranging procedure, receive, from a plurality of responder anchors, a plurality of second UWB messages transmitted in response to the first UWB message, receive, from the initiator anchor, a third UWB message transmitted in response to the second UWB message, receive, from the plurality of responder anchors, a plurality of fourth UWB messages transmitted in response to the third UWB message, and perform DL-TDoA-based localization based on the first UWB message, the second UWB message, the third UWB message, and the fourth UWB message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates a structure of a UWB medium access control (MAC) frame according to an embodiment of the disclosure;

FIG. 6 illustrates various examples of a UWB ranging method according to an embodiment of the disclosure;

FIG. 11 illustrates a structure of a UWB message according to an embodiment of the disclosure;

FIG. 12A illustrates a payload structure of a UWB message according to an embodiment of the disclosure;

FIG. 12B illustrates a payload structure of a UWB message according to an embodiment of the disclosure;

FIGS. 13A and 13B illustrate an example of a one-way ranging (OWR) message type-dependent payload field included in a UWB message according to various embodiments of the disclosure;

FIG. 14 illustrates a UWB Command Interface (UCI) command for establishing a session for an initiator anchor according to an embodiment of the disclosure;

Throughout the drawings, it should be noted that like reference numbers are used to depict the same or similar elements, features, and structures.

DETAILED DESCRIPTION

Figure 1:
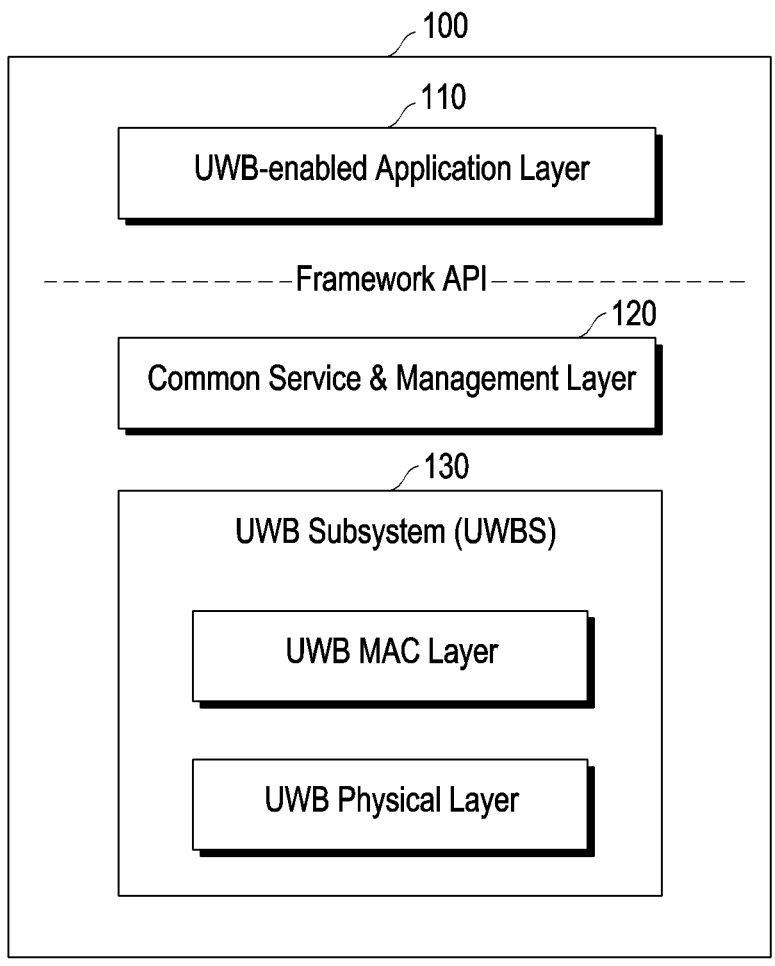
FIG. 1 illustrates an example architecture of a UWB device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, a 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more CPUs in a device or secure multimedia card. According to an embodiment, a " . . . unit" may include one or more processors.

As used herein, the term 'terminal' or 'device' may also be referred to as a mobile station (MS), user equipment (UE), user terminal (UT), terminal, wireless terminal, access terminal (AT), subscriber unit, subscriber station (SS), wireless device, wireless communication device, wireless transmit/receive unit (WTRU), mobile node, or mobile or may be referred to in other terms. Various embodiments of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, the terminal may include a machine to machine (M2M) terminal and a machine-type communication (MTC) terminal/device, but is not limited thereto. In the disclosure, the terminal may be referred to as an electronic device or simply as a device.

Hereinafter, the operational principle of the disclosure is described below with reference to the accompanying drawings. When determined to make the subject matter of the disclosure unnecessarily unclear, the detailed description of known functions or configurations may be skipped in describing embodiments of the disclosure. The terms as used herein are defined considering the functions in the disclosure and may be replaced with other terms according to the intention or practice of the user or operator. Therefore, the terms should be defined based on the overall disclosure.

Hereinafter, embodiments of the disclosure are described in detail with reference to the accompanying drawings. Further, although a communication system using UWB is described in connection with embodiments of the disclosure, as an example, embodiments of the disclosure may also apply to other communication systems with similar technical background or features. For example, a communication system using Bluetooth or ZigBee may be included therein. Further, embodiments of the disclosure may be modified in such a range as not to significantly depart from the scope of the disclosure under the determination by one of ordinary skill in the art and such modifications may be applicable to other communication systems.

When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

In general, wireless sensor network technology is largely divided into a wireless local area network (WLAN) technology and a wireless personal area network (WPAN) technology according to the recognition distance. In this case, WLAN is a technology based on institute of electrical and electronics engineers (IEEE) 802.11 which enables access to the backbone network within a radius of about 100 m. WPAN is a technology based on IEEE 802.15 which includes Bluetooth, ZigBee, and ultra-wide band (UWB). A wireless network in which such a wireless network technology is implemented may include a plurality of electronic devices.

According to the definitions by the Federal Communications Commission (FCC), UWB may refer to a wireless communication technology that uses a bandwidth of 500 megahertz (MHz) or more or a bandwidth corresponding to a center frequency of 20% or more. UWB may mean a band itself to which UWB communication is applied. UWB may enable secure and accurate ranging between devices. Thus, UWB enables relative position estimation based on the distance between two devices or accurate position estimation of a device based on the distance from fixed devices (whose positions are known).

The terminology used herein is provided for a better understanding of the disclosure, and changes may be made thereto without departing from the technical spirit of the disclosure.

"Application dedicated file (ADF)" may be, e.g., a data structure in an application data structure that may host an application or application specific data.

"Application protocol data unit (APDU)" may be a command and a response used when communicating with the application data structure in the UWB device.

"Application specific data" may be, e.g., a file structure having a root level and an application level including UWB controlee information and UWB session data required for a UWB session.

"Controller" may be a ranging device that defines and controls ranging control messages (RCM) (or control messages). The controller may define and control ranging features by transmitting a control message.

"Controlee" may be a ranging device using a ranging parameter in the RCM (or control message) received from the controller. The controlee may use the same ranging features as those configured through control messages from the controller.

Unlike "static STS," "dynamic scrambled timestamp sequence (STS) mode" may be an operation mode in which the STS is not repeated during a ranging session. In this mode, the STS may be managed by the ranging device, and the ranging session key that generates STS may be managed by a secure component.

"Applet" may be, e.g., an applet executed on the secure component including UWB parameters and service data. The applet may be a FiRa applet.

"Ranging device" may be a device capable of performing UWB ranging. In the disclosure, the ranging device may be an enhanced ranging device (ERDEV) defined in IEEE 802.15.4z or a FiRa Device. The ranging device may be referred to as a UWB device.

"UWB-enabled Application" may be an application for UWB service. For example, the UWB-enabled Application may be an application using a Framework application programming interface (API) for configuring an out-of-band (OOB) Connector, a Secure Service, and/or a UWB service for a UWB session. "UWB-enabled Application" may be abbreviated as an application or a UWB application. UWB-enabled Application may be a FiRa-enabled Application.

"Framework" may be a component that provides access to Profiles, individual-UWB configuration and/or notifications. "Framework" may be, e.g., a collection of logical software components including Profile Manager, OOB Connector, Secure Service, and/or UWB service. The framework may be a FiRa framework.

"OOB Connector" may be a software component for establishing an out-of-band (OOB) connection (e.g., Bluetooth low energy (BLE) connection) between Ranging Devices. The OOB connector may be a FiRa OOB connector.

"Profile" may be a previously defined set of UWB and OOB configuration parameters. The profile may be a FiRa profile.

"Profile Manager" may be a software component that implements a profile available on the Ranging Device. The profile manager may be a FiRa profile manager.

"Service" may be an implementation of a use case that provides a service to an end-user.

"Smart Ranging Device" may be a ranging device that may implement an optional Framework API. The smart ranging device may be a FiRa smart device.

"Global Dedicated File (GDF)" may be a root level of application specific data including data required to establish a USB session.

"Framework API" may be an API used by a UWB-enabled Application to communicate with the Framework.

"Initiator" may be a Ranging Device that initiates a ranging exchange. The initiator may initiate a ranging exchange by transmitting a first RFRAME (ranging exchange message).

"Object Identifier (OID)" may be an identifier of the ADF in the application data structure.

"Out-Of-Band (OOB)" may be data communication that does not use UWB as an underlying wireless technology.

"Ranging Data Set (RDS)" may be data (e.g., UWB session key, session ID, etc.) required to establish a UWB session when it is needed to protect confidentiality, authenticity and integrity.

"Responder" may be a ranging device that responds to the Initiator in a ranging exchange. The responder may respond to the ranging exchange message received from the initiator.

"STS" may be a ciphered sequence for increasing the integrity and accuracy of ranging measurement timestamps. The STS may be generated from the ranging session key.

"Secure Channel" may be a data channel that prevents overhearing and tampering.

"Secure Component" may be an entity (e.g., secure element (SE) or trusted execution environment (TEE) having a defined security level that interfaces with UWBS for the purpose of providing RDS to UWBS, e.g., when dynamic STS is used.

"Secure Element (SE)" may be a tamper-resistant secure hardware component that may be used as a Secure Component in the Ranging Device.

"Secure Ranging" may be ranging based on STS generated through a strong encryption operation.

"Secure Service" may be a software component for interfacing with a Secure Component, such as a Secure Element or Trusted Execution Environment (TEE).

"Service Applet" may be an applet on a Secure Component that handles service specific transactions.

"Service Data" may be data defined by a service provider that needs to be transferred between two ranging devices to implement a service.

"Service Provider" may be an entity that defines and provides hardware and software required to provide a specific service to an end-user.

"Static STS mode" is an operation mode in which STS is repeated during a session, and does not need to be managed by the Secure Component.

"Secure UWB Service (SUS) Applet" may be an applet on the SE that communicates with the applet to retrieve data needed to enable secure UWB sessions with other ranging devices. The SUS Applet may transfer corresponding data (information) to the UWBS.

"UWB Service" may be a software component that provides access to the UWBS.

"UWB Session" may be a period from when the Controller and the Controlee start communication through UWB until the communication stops. A UWB Session may include ranging, data transfer, or both ranging and data transfer.

"UWB Session ID" may be an ID (e.g., a 32-bit integer) that identifies the UWB Session, shared between the controller and the controller.

"UWB session key" may be a key used to protect the UWB Session. The UWB Session Key may be used to generate the STS. The UWB session key may be a UWB ranging session key (URSK), and may be abbreviated as a session key.

"UWB Subsystem (UWBS)" may be a hardware component implementing the UWB PHY and MAC layers specifications. UWBS may have an interface to Framework and an interface to Secure Component to search for RDS.

"UWB message" may be a message including a payload information element (IE) transmitted by the UWB device (e.g., ERDEV).

"Payload IE" may be an IE included in the MAC payload of the UWB MAC frame. The MAC payload may include one or more payload IEs.

"Scheduled-based ranging" may be used for the ranging round scheduled by the controller for the controlees to transmit ranging frames (RFRAMEs) and/or measurement reports in different ranging slots. Scheduling-based ranging may be referred to as time-scheduled ranging. A scheduling mode in which scheduling-based ranging is used may be referred to as a time-scheduled mode.

"Contention-based ranging" may be used when the controller does not know the MAC addresses of controlees participating in the UWB session (ranging session). In contention-based ranging, the controller may be an initiator and may perform ranging with other unknown UWB devices. The scheduling mode in which contention-based ranging is used may be referred to as a contention-based mode.

The contention-based ranging may be used for the ranging round in which the controller determines the size of the contention access period and indicates the contention access period (CAP) size through a ranging control message. The CAP may be referred to as a contention window or a contention window period.

In the contention-based mode, the UWB device may operate as a controller and an initiator, and in this case, the ranging control phase (RCP) and the ranging initiation phase (RIP) may be merged into one phase (e.g., RIP). In the ranging phase (RP), the allocation of the CAP size may determine the CAP period for the responder(s) participating in the corresponding ranging round in units of ranging slots. Each responder may randomly determine one slot in the CAP to transmit a ranging response message (RRM). Messages used in contention-based ranging may use SP1 as an RFRAME configuration.

"Hybrid ranging" may be used when there is a known controlee and an unknown controlee. As described above, the known controlee may be a controlee whose MAC address is known to the controller, and the unknown controlee may be a controlee whose MAC address is not known to the controller. In this disclosure, hybrid ranging may be referred to as hybrid-based ranging. The scheduling mode in which hybrid ranging is used may be referred to as a hybrid-based mode.

In the hybrid-based mode, the controller may perform ranging with the known controlee in the scheduling-based mode and with the unknown controlee in the contention-based mode.

In the hybrid-based mode, the ranging round may include a ranging control phase RCP and a ranging phase RP. The RP may include a contention free period for scheduling-based ranging (access) and a contention access period (CAP) for contention-based ranging (access). The control message (ranging control message) used in the RCP of the hybrid-based mode may be referred to as a ranging management message (RMM).

"Downlink Time Difference of Arrival (DL-TDoA, DT)" may be a positioning method for one or more tag devices (DT-Tag) to estimate their position based on the DL-TDoA message (DTM) received from at least one anchor device (DT-anchor). In DL-TDoA, the anchor device transmits or broadcasts the DTM, and the tag device passively receives the DTM, thereby preventing exposure of the position of the tag device.

In DL-TDoA, the anchor device may precisely measure its own DTM transmission time and the reception time of the received DTM. The anchor device may include the transmission time in the DTM it transmits or broadcasts. The tag device may measure the reception times of all received DTMs and estimate its position by using the reception timestamps and obtained coordinates of the anchor devices. DL-TDoA may be classified as a type of one way ranging like Uplink TDoA. DL-TDoA may be referred to as DL-TDoA localization.

"Anchor device" may be a UWB device deployed at a specific position to provide a positioning service. For example, the anchor device may be a UWB device installed by a service provider on a wall, ceiling, structure, or the like in a room to provide an indoor positioning service. In DL-TDoA, the anchor device may be a device that transmits the DTM that the tag device may use to calculate the position based on TDoA localization (DL-TDoA localization). In DL-TDoA, the anchor devices may be divided into the initiator anchor and responder anchors according to the order and role of transmitting messages and participate in the ranging round. The anchor device may be referred to as a UWB anchor or a UWB anchor device. The anchor device of DL-TDoA may be referred to as a DL-TDoA anchor or DT-anchor.

The "initiator anchor" may notify of the initiation of the TDoA ranging round (DL-TDoA ranging round). In DL-TDoA, the initiator anchor may initiate a DL-TDoA ranging round by transmitting an initiation message and may schedule the transmission time of the responder anchor(s). For example, the initiator anchor may schedule the ranging slot in which the responder anchor(s) operating in the same ranging round sends a response message (response DTM). The initiation message may be referred to as an initiator DTM, a poll message, a poll DTM, or a first DTM. The initiator anchor may be referred to as an initiator UWB anchor, an initiator anchor device, or an initiator DT-anchor.

The initiator anchor may additionally transfer an end message (final DTM) message after receiving the response from the responder anchor(s). The initiator anchor may additionally transmit a final DTM after all responder anchors in the same cluster transmit a response message (response DTM) in the DL-TDoA ranging round. The end message may be referred to as final DTM or third DTM.

There may be at least one reference initiator anchor in the DL-TDoA network. The reference initiator anchor serves as a global time reference for inter-cluster synchronization as an initiator anchor, and may configure a common ranging block structure for the DL-TDoA network to operate. The reference initiator anchor may be referred to as a master anchor or a global anchor.

The responder anchor may be a UWB anchor responding to the initiation message of the initiator anchor. The responder anchor may respond to the initiator anchor with a response message. The response message may be referred to as a responder DTM, a response DTM, or a second DTM. The "responder anchor" may also be referred to as a Responder UWB anchor, a Responder UWB anchor device, a Responder anchor device, etc.

The "tag device" may estimate its position (e.g., geographical coordinates) by using TDoA measurement based on the DTM received from the anchor device in DL-TDoA. The tag device may previously know the position of the anchor device. The tag device may be referred to as a UWB tag, user equipment (UE), or UWB tag device, and the DL-TDoA tag device may be referred to as a DL-TDoA tag or a DT-tag.

The tag device may receive the message transmitted by the anchor device and measure the reception time of the message. The tag device may obtain the geographic coordinates of the anchor device through an in-band or out-band method. The tag device may skip the ranging block when the position update rate is lower than that supported by the network.

"Cluster" may mean a set of anchor devices covering a specific area. In DL-TDoA, cluster may mean a set of anchor devices that exchange DTMs to provide a position service to at least one tag device. The cluster may be constituted of an initiator anchor and at least one responder anchor.

One anchor device may operate in one or more clusters. In this case, the anchor device acting as an initiator anchor in some clusters may act as a responder anchor in other clusters. The cluster area may be a space formed by the anchor devices constituting the cluster. To support the positioning service for a wide area, a plurality of clusters may be configured to provide the positioning service to the UE. Cluster may be referred to as a cell.

When determined to make the subject matter of the disclosure unnecessarily unclear, the detailed description of related known functions or features may be skipped in describing the disclosure.

Hereinafter, various embodiments of the disclosure are described with reference to the accompanying drawings.

FIG. 1 illustrates an example architecture of a UWB device according to an embodiment of the disclosure.

In the disclosure, the UWB device 100 may be an electronic device supporting UWB communication. The UWB device 100 may be, e.g., a ranging device supporting UWB ranging. In an embodiment, the ranging device may be an enhanced ranging device (ERDEV) defined in IEEE 802.15.4z or a FiRa Device.

In the embodiment of FIG. 1, the UWB device 100 may interact with other UWB devices through a UWB session.

The UWB device 100 may implement a first interface (Interface #1) that is an interface between the UWB-enabled Application 110 and the Framework 120, and the first interface allows the UWB-enabled application 110 on the UWB device 100 to use the UWB capabilities of the UWB device 100 in a predetermined manner. In an embodiment, the first interface may be a Framework API or a proprietary interface, but is not limited thereto.

The UWB device 100 may implement a second interface (Interface #2) that is an interface between the UWB Framework 120 and the UWB subsystem (UWBS, 130). In an embodiment, the second interface may be a UWB Command Interface (UCI) or proprietary interface, but is not limited thereto.

Referring to FIG. 1, the UWB device 100 may include a UWB-enabled Application 110, a Framework (UWB Framework) 120, and/or a UWBS 130 including a UWB MAC Layer and a UWB Physical Layer. Depending on the embodiment, some entities may not be included in the UWB device, or additional entities (e.g., security layer) may be further included.

The UWB-enabled Application 110 may trigger establishment of a UWB session by a UWBS 130 through the first interface. The UWB-enabled Application 110 may use one of previously defined profiles (profile). The UWB-enabled Application 110 may use the first interface to handle related events, such as service discovery, ranging notifications, and/or error conditions.

The Framework 120 may provide access to Profiles, individual-UWB configuration and/or notifications. The Framework 120 may support at least one of a function for UWB ranging and transaction execution, a function to provide an interface to the application and UWBS 130, or a function to estimate the location of the device 100. The Framework 120 may be a set of software components. As described above, the UWB-enabled Application 110 may interface with the Framework 120 through the first interface, and the Framework 120 may interface with the UWBS 130 through the second interface.

Meanwhile, in the disclosure, the UWB-enabled Application 110 and/or Framework 120 may be implemented by an application processor (AP) (or processor). Accordingly, in the disclosure, the operation of the UWB-enabled Application 110 and/or the Framework 120 may be understood as performed by an AP (or a processor). In this disclosure, the framework may be referred to as an AP or a processor.

The UWBS 130 may be a hardware component including a UWB MAC Layer and a UWB Physical Layer. The UWBS 130 may perform UWB session management and may communicate with the UWBS of another UWB device. The UWBS 130 may interface with the Framework 120 through the second interface and may obtain the secure data from the Secure Component. In an embodiment, the Framework (or application processor) 120 may transmit a command to the UWBS 130 through UCI, and the UWBS 130 may transmit a response to the command to the Framework 120. The UWBS 130 may transfer a notification to the Framework 120 through the UCI.

Figure 2:
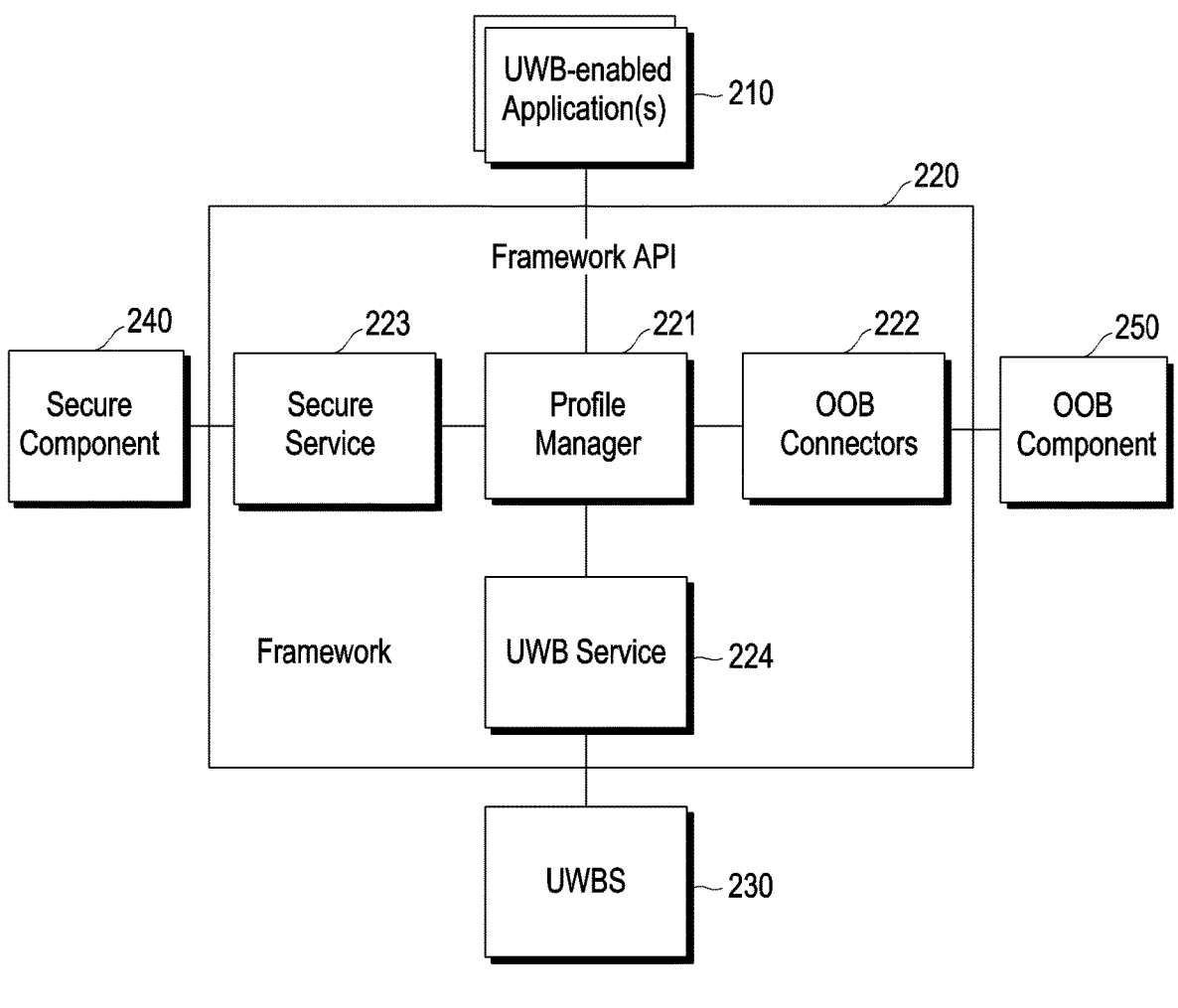
FIG. 2 illustrates an example configuration of a framework of a UWB device according to an embodiment of the disclosure.

FIG. 2 illustrates an example configuration of a framework of a UWB device according to an embodiment of the disclosure.

The UWB device of FIG. 2 may be an example of the UWB device of FIG. 2.

Referring to FIG. 2, the Framework 220 may include, e.g., software components, such as Profile Manager 221, OOB Connector(s) 222, Secure Service 223 and/or UWB Service 224.

The Profile Manager 221 may serve to manage profiles available on the UWB device. Profile may be a set of parameters required to establish communication between UWB devices. For example, a profile may include a parameter indicating which OOB secure channel is used, a UWB/OOB configuration parameter, a parameter indicating whether the use of a particular secure component is mandatory, and/or a parameter related to the file structure of the ADF. The UWB-enabled Application 210 may communicate with the Profile Manager 221 through the first interface (e.g., Framework (API)).

The OOB Connector 222 may serve to establish an OOB connection with another device. The OOB Connector 222 may handle an OOB step including a discovery step and/or a connection step. The OOB component (e.g., BLE component) 250 may be connected to the OOB connector 222.

The Secure Service 223 may play a role of interfacing with a Secure Component 240, such as SE or TEE.

The UWB Service 224 may perform a role of managing the UWBS 230. The UWB Service 224 may provide access to the UWBS 230 from the Profile Manager 221 by implementing the second interface.

FIG. 3 illustrates a structure of a UWB MAC frame according to an embodiment of the disclosure.

In the embodiment of FIG. 3, the UWB MAC frame may be simply referred to as a MAC frame or frame. As an embodiment, the UWB MAC frame may be used to transfer UWB-related data (e.g., UWB message, ranging message, control information, service data, application data, etc.).

Referring to FIG. 3, the UWB MAC frame may include a MAC header (MHR), a MAC payload and/or a MAC footer (MFR).

(1) MAC Header

The MAC header may include a Frame Control field, a Sequence Number field, a Destination Address field, a Source Address field, an Auxiliary Security Header field, and/or at least one Header IE field. According to an embodiment, some of the above-described fields may not be included in the MAC header, and additional field(s) may be further included in the MAC header.

In an embodiment, the Frame Control field may include a Frame type field, a Security Enabled field, a Frame Pending field, an ack request (AR) field, a PAN ID Compression field (PAN ID Present field), a Sequence Number Suppression field, an IE Present field, a Destination Addressing Mode field, a Frame Version field, and/or a Source Addressing Mode field. According to an embodiment, some of the above-described fields may not be included in the Frame Control field. Additional field(s) may be further included in the Frame Control field.

Each field is described below.

The Frame Type field may indicate the frame type. As an embodiment, the frame type may include a data type and/or a multipurpose type.

The Security Enabled field may indicate whether an Auxiliary Security Header field exists. The Auxiliary Security Header field may include information required for security processing.

The Frame Pending field may indicate whether the device transmitting the frame has more data for the recipient. In other words, the Frame Pending field may indicate whether there is a pending frame for the recipient.

The Ack Request (AR) field may indicate whether acknowledgment for frame reception is required from the recipient.

The PAN ID Compression field (PAN ID Present field) may indicate whether the PAN ID field exists.

The Sequence Number Suppression field may indicate whether the Sequence Number field exists. The Sequence Number field may indicate the sequence identifier for the frame.

The IE Present field may indicate whether the Header IE field and the Payload IE field are included in the frame.

The Destination Addressing Mode field may indicate whether the Destination Address field may include a short address (e.g., 16 bits) or an extended address (e.g., 64 bits). The Destination Address field may indicate the address of the recipient of the frame.

The Frame Version field may indicate the frame version. For example, the Frame Version field may be set to a value indicating IEEE std 802.15.4z-2020.

The Source Addressing Mode field may indicate whether the Source Address field exists, and if the Source Address field exists, whether the Source Address field includes a short address (e.g., 16 bits) or an extended address (e.g., 64 bits). The Source Address field may indicate the address of the originator of the frame.

(2) MAC Payload

The MAC payload may include at least one Payload IE field. In an embodiment, the Payload IE field may include a Vendor Specific Nested IE.

(3) MAC Footer

The MAC footer may include an FCS field. The FCS field may include a 16-bit CRC or a 32-bit CRC.

Figure 4:
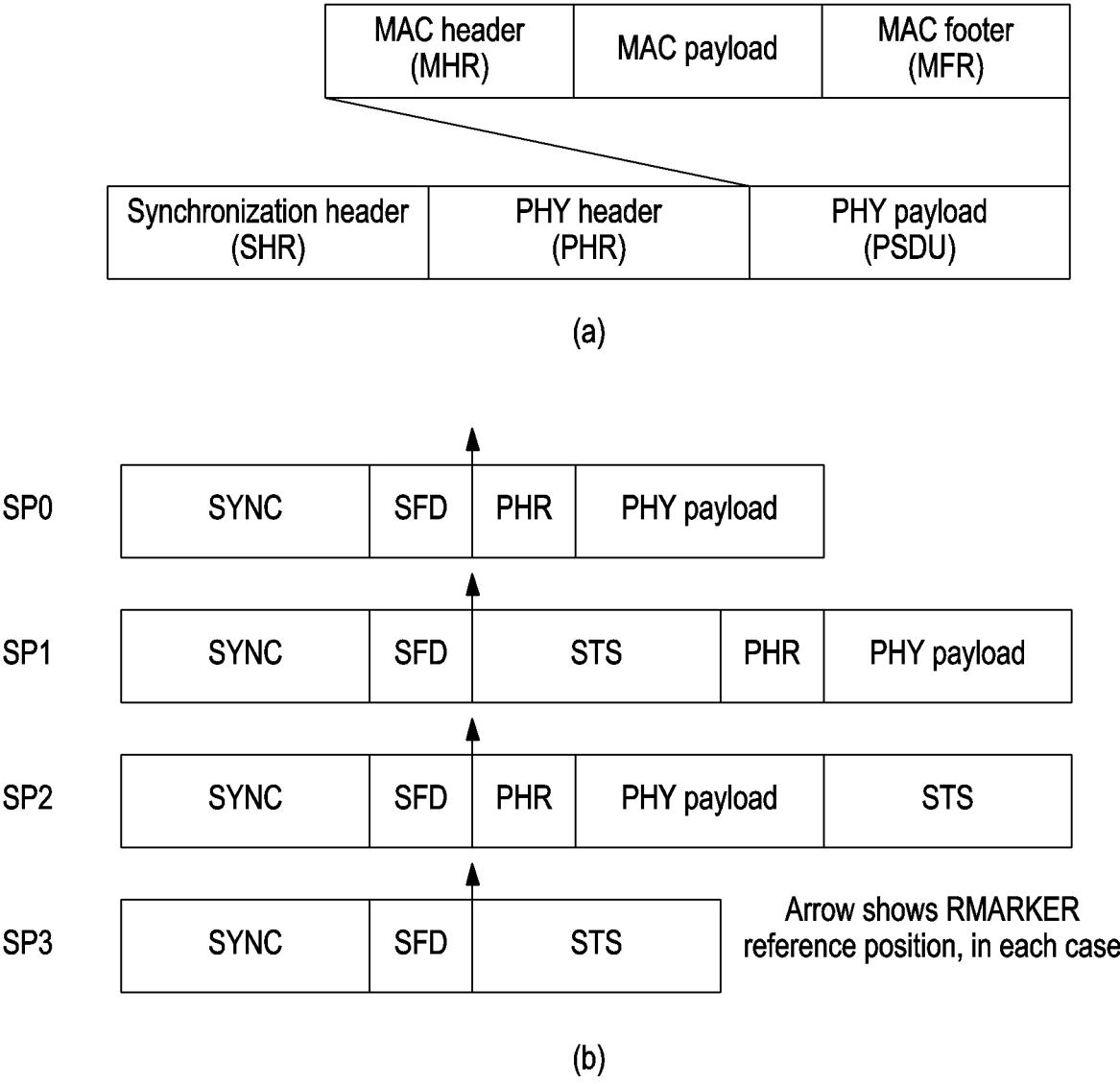
FIG. 4 illustrates a structure of a UWB physical layer (PHY) packet according to an embodiment of the disclosure.

FIG. 4 illustrates a structure of a UWB PHY packet according to an embodiment of the disclosure.

Part (a) of FIG. 4 illustrates an example structure of a UWB PHY packet to which the STS packet configuration is not applied, and part (b) of FIG. 4 illustrates an example structure of a UWB PHY packet to which the STS packet configuration is applied. The UWB PHY packet may be referred to as a PHY packet, a PHY PDU physical protocol data unit (PPDU), or a frame.

Referring to part (a) of FIG. 4, the PPDU may include a synchronization header (SHR), a PHY header (PHR), and a PHY payload (PSDU). The PSDU may include a MAC frame. Referring to FIG. 2, the MAC frame may include a MAC header (MHR), a MAC payload and/or a MAC footer (MFR). The synchronization header part may be referred to as a preamble, and the part including the PHY header and the PHY payload may be referred to as a data part.

The synchronization header may be used for synchronization for signal reception and may include a SYNC field and a start-of-frame delimiter (SFD).

The SYNC field may be a field including a plurality of preamble symbols used for synchronization between transmission/reception devices. The preamble symbol may be set through one of previously defined preamble codes.

The SFD field may be a field indicating the end of the SHR and the start of the data field.

The PHY header may provide information about the configuration of the PHY payload. For example, the PHY header may include information about the length of the PSDU, information indicating whether the current frame is an RFRAME (or Data Frame), and the like.

Meanwhile, the PHY layer of the UWB device may include an optional mode to provide a reduced on-air time for high density/low power operation. In this case, the UWB PHY packet may include an encrypted sequence (i.e., STS)

to increase the integrity and accuracy of the ranging measurement timestamp. An STS may be included in the STS field of the UWB PHY packet and be used for secure ranging.

Referring to (b) of FIG. 4, in the case of STS packet (SP) setting 0 (SP0), the STS field is not included in the PPDU (SP0 packet). In the case of SP setting 1 (SP1), the STS field is positioned immediately after the Start of Frame Delimiter (SFD) field and before the PHR field (SP1 packet). In the case of SP setting 2 (SP2), the STS field is positioned after the PHY payload (SP2 packet). In the case of SP setting 3 (SP3), the STS field is positioned immediately after the SFD field, and the PPDU does not include the PHR and data field (PHY payload) (SP3 packet). In other words, in the case of SP3, the PPDU does not include the PHR and PHY payload.

Referring to part (b) of FIG. 4, each UWB PHY packet may include RMARKER for defining a reference time. RMARKER may be used to obtain the transmission time, reception time and/or time range of the ranging message (frame) in the UWB ranging procedure.

Figure 5A:
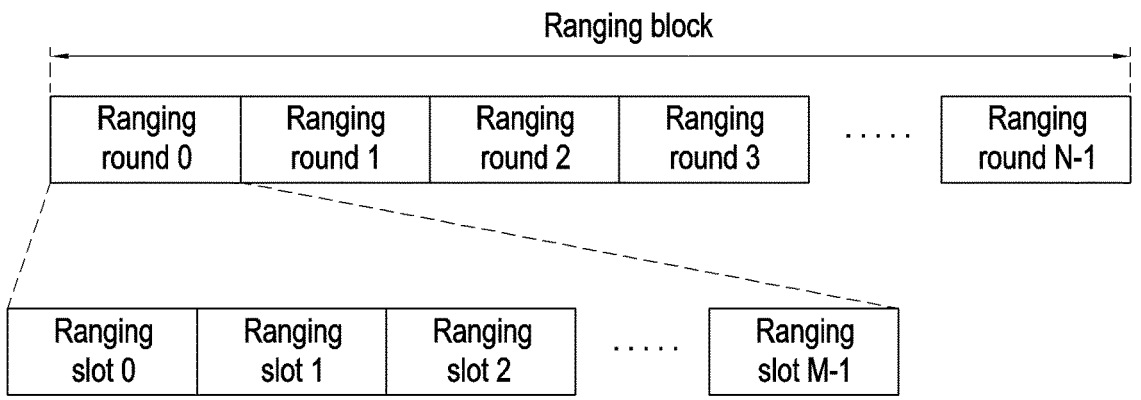
FIG. 5A illustrates an example of a ranging block structure according to an embodiment of the disclosure.
Figure 5B:
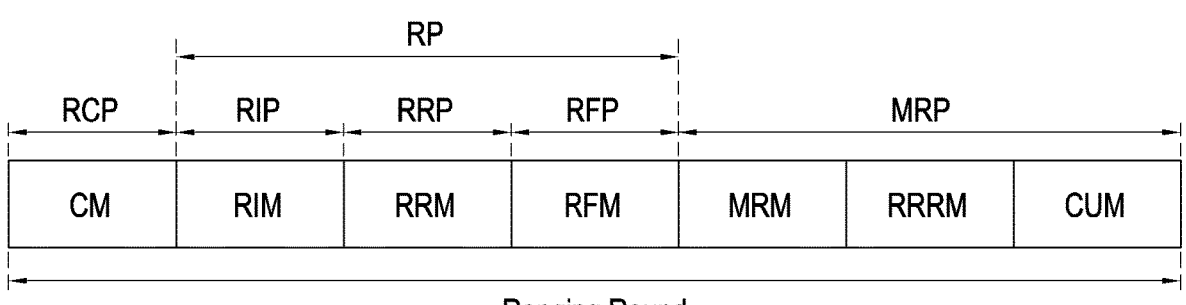
FIG. 5B illustrates a structure of a ranging round according to an embodiment of the disclosure.

FIG. 5A illustrates an example of a ranging block structure according to an embodiment of the disclosure. FIG. 5B illustrates a structure of a ranging round according to an embodiment of the disclosure.

Referring to FIG. 5A, one ranging block may include at least one ranging round. Each ranging round may include at least one ranging slot. For example, as shown, one ranging block includes N ranging rounds (e.g., ranging round index 0 to ranging round index N−1), and ranging round #0 includes M ranging slots. (e.g., ranging slot 0 to ranging slot M).

The ranging block refers to a time period for ranging. The ranging round may be a period of sufficient duration to complete one entire range-measurement cycle (ranging cycle) in which a set of ranging devices participating in a ranging exchange involves. The ranging slot may be a sufficient period for transmission of at least one ranging frame (RFRAME) (e.g., ranging initiation/reply/final message, etc.).

When the ranging mode is a block-based mode, a mean time between contiguous ranging rounds may be a constant. Alternatively, when the ranging mode is an interval-based mode, the time between contiguous ranging rounds may be dynamically changed. In other words, the interval-based mode may adopt a time structure having an adaptive spacing.

The ranging block may be abbreviated as a block, the ranging round as a round, and the ranging slot as a slot.

Referring to FIG. 5B, one ranging round may include a ranging control phase (RCP), a ranging phase (RP), and/or a measurement report phase (MRP). For example, one ranging round may include one slot for the RCP, at least one slot for the RP, and/or at least one slot for the MRP.

According to an embodiment, some of the above-described phases may not be included in the ranging round, or additional phases may be further included in the ranging round. For example, the RCP may not be included in the ranging round. In this case, the ranging control message (RCM) may be merged with the ranging initiation message (RIM). For example, a ranging control update phase (RCUP) and/or a ranging interval update phase (RIUP) may be further included in the ranging round.

The RCP may be a phase in which the controller transmits RCM. The RCM may be a message transmitted by the controller to set ranging parameters. In an embodiment, the RCM may be transmitted in the first slot (slot #0) of the ranging round. The RCM may be abbreviated as control message (CM).

The RP may include a ranging initiation phase (RIP), a ranging response phase (RRP), and/or a ranging final phase (RFP).

The RIP may be a phase in which initiator(s) transmit RIM(s) to responder(s).

The RRP may be a phase in which the responder(s) transmit their ranging response message (RRM)(s) to the initiator.

The RFP may be a phase in which an initiator transmits ranging final message(s) (RFM(s)) to responder(s). The ranging final phase may only be used for DS-TWR.

The MRP may be a phase in which participating ranging devices exchange service information related to ranging measurement. In MRP, a measurement report message (MRM), a ranging result report message (RRRM), and/or a control update message (CUM) may be transmitted. The MRM may be a message transmitted by the UWB device to exchange measurement information. The RRRM may be a message transmitted by the UWB device for reporting the ranging result. The CUM may be a message transmitted by the controller to update control information. The CUM may be referred to as a ranging control update message (RCUM).

The RCUP may be a phase in which the controller transmits a ranging control update message (RCUM). The ranging control update phase may be included in the last slot of the set of ranging rounds designated by the RCM. The RCUM may be a message transmitted by the controller to update ranging parameters for the next ranging round(s). The RCUM may be transmitted in the last slot of the ranging round(s) designated by the RCM. The RCUM may include some or all of the information elements (IEs) employed by the RCM to update the values of parameters.

The ranging interval update phase (RIUP) may be a phase in which the controller transmits a ranging interval update message (RIUM). The RIUM may be a message transmitted by the controller to help synchronization between participating ranging devices or to update the interval between ranging blocks. The RIUM includes the scheduled time of the first RIUM. The RIUM may include the scheduled time of the next RIUM before the next ranging block starts.

If necessary, the plurality of predetermined UWB messages may be merged into one message. For example, the RCM may be merged with the RIM and transported in the RIP. For example, in the case of non-deferred DS-TWR ranging, the RFM may be merged with the MRM and transmitted in the RFP.

FIG. 6 illustrates various examples of a UWB ranging method according to an embodiment of the disclosure.

Part (a) of FIG. 6 illustrates an example of a two-way ranging (TWR) scheme, part (b) of FIG. 6 illustrates an example of an uplink TDoA (UL-TDoA) scheme which is a type of OWR, and part (c) of FIG. 6 illustrates an example of a downlink TDoA (DL-TDoA) scheme which is a type of OWR.

Referring to part (a) of FIG. 6, the UWB device 620a of the user may perform ranging with at least one UWB anchor 610a through ranging exchange using a plurality of ranging messages. Through the ranging exchange, the time of flight (ToF) may be calculated, and the distance between the two devices may be estimated.

The UWB device 620a may perform single-sided two-way ranging (SS-TWR) or double-sided two-way ranging (DS-TWR) with the UWB anchor 610a. When performing the TWR, the UWB device 620a may serve as an initiator or a responder.

In an embodiment, the TWR may be performed according to a contention-based mode and/or a scheduling-based mode.

Referring to part (b) of FIG. 6, a user's UWB device (UWB tag) 620a may transmit (broadcast) a ranging message to at least one UWB anchor 610b, and the at least one UWB anchor 610b may obtain a TDoA based on the received ranging message and estimate the position of the UWB device 620b based on the TDoA. The TDoA scheme of the embodiment of part (b) of FIG. 6 may be referred to as an uplink TDoA (UL-TDoA) scheme.

Referring to part (c) of FIG. 6, the UWB device (UWB tag or DT-tag) 620c of the user may estimate its position by receiving ranging messages transmitted/received by at least one UWB anchor 610c. An example of such a DL-TDoA scheme is described below with reference to FIGS. 7A and 7B.

Figure 7A:
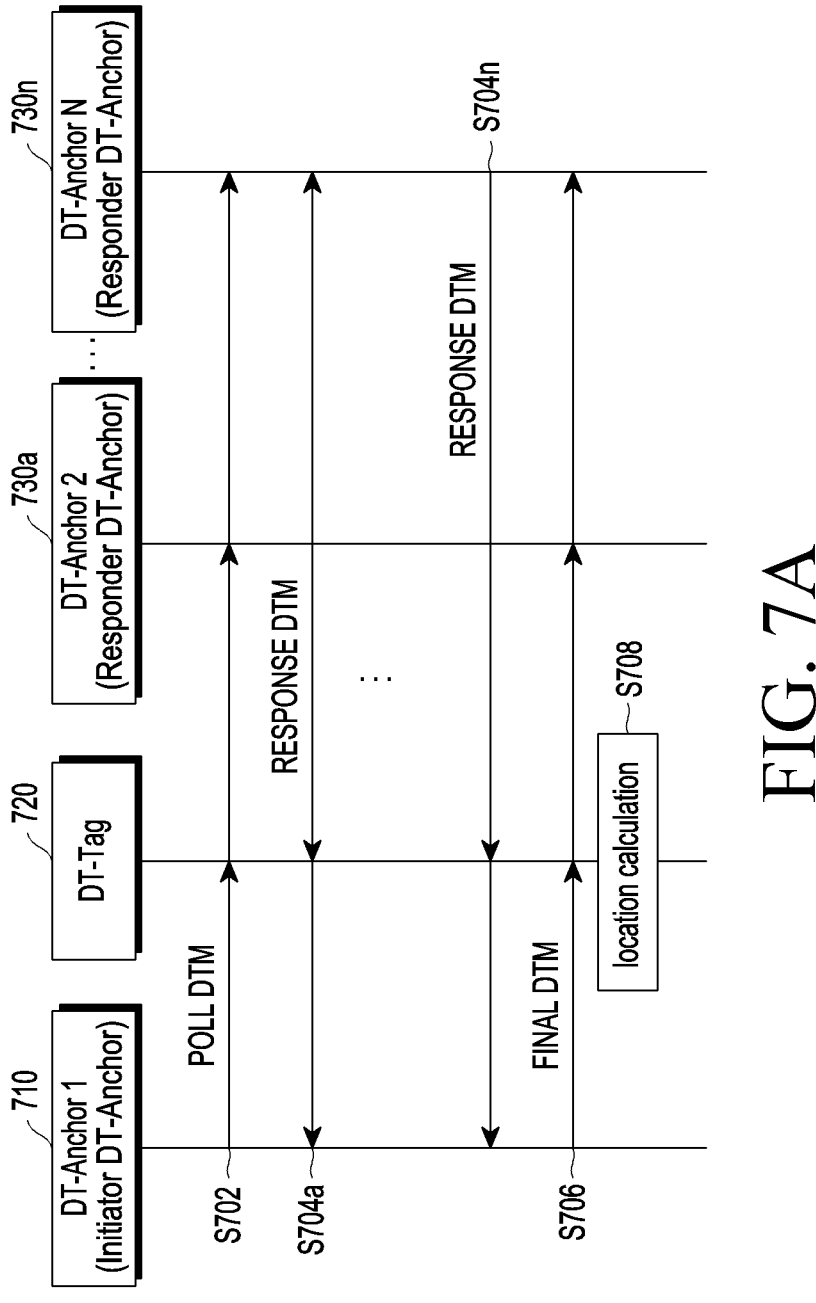
FIG. 7A illustrates a method for a UWB device to perform UWB ranging in a DL-TDoA scheme according to an embodiment of the disclosure.

FIG. 7A illustrates a method for a UWB device to perform UWB ranging in a DL-TDoA scheme according to an embodiment of the disclosure.

The embodiment of FIG. 7A assumes that one initiator anchor (initiator DT-anchor) 710 and n responder anchors 730a . . . 730n operate as UWB anchors (DT-anchors). However, the embodiment is not limited thereto, and the number of initiator anchors and responder anchors may be varied according to an embodiment.

In operation S702, the initiator anchor 710 may initiate a DL-TDoA round by transmitting or broadcasting the poll DTM received by the responder anchor in the cluster. The poll DTM may include scheduling information for each responder anchor to transmit the response DTM in the allocated ranging slot.

In an embodiment, all responder anchors 730a, . . . 730n may reference the scheduling information in the poll DTM, thereby knowing whether to transmit the response DTM and the slot (slot index) used to transmit the response DTM.

In operations S704a, . . . , S704n, all responder anchors 730a, . . . , 730n receiving the poll DTM may respond to the initiator anchor 710 using the response DTM in the ranging slot allocated by the poll DTM. For example, each responder anchor 730a, . . . , 730n may transmit or broadcast a response DTM in its ranging slot allocated by the poll DTM.

In operation S706, the initiator anchor 710 receiving the response DTMs may additionally transmit the final DTM to the responder anchors 730a, . . . , 730n. For example, the initiator anchor 710 may transmit or broadcast the final DTM after receiving response DTMs from responder anchors 730a, . . . , 730n.

In operation S708, the tag device (DT-Tag) 720 may receive (or overhear) the poll DTM, response DTMs, and final DTM and calculate the TDoA values through the information included in the message and the reception timestamp. The tag device 720 may obtain (or estimate) its position based on the calculated TDoA values. Thus, the tag device 720 may estimate its own position without exposing its own position.

Figure 7B:
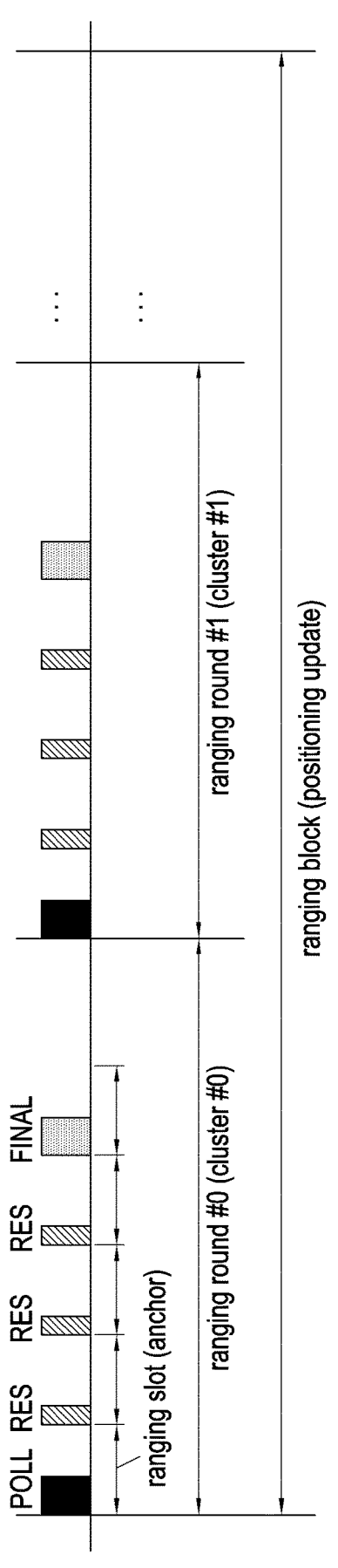
FIG. 7B illustrates an example of a ranging block structure for a downlink TDoA scheme according to an embodiment of the disclosure.

FIG. 7B illustrates an example of a ranging block structure for a downlink TDoA scheme according to an embodiment of the disclosure.

The ranging block structure of FIG. 7B may be an example of a ranging block structure for performing the ranging scheme of FIG. 7A.

Referring to FIG. 7B, the ranging block may include a plurality of ranging rounds.

As an embodiment, the ranging block may include a plurality of ranging rounds allocated for each of the plurality of clusters. For example, when n clusters are deployed, the ranging block may include a first ranging round allocated for a first cluster, a second ranging round allocated for a second cluster, and an nth ranging round allocated for an nth cluster. Although not shown in FIG. 7B, according to an embodiment, a plurality of ranging rounds may be allocated to one cluster, or one ranging round may be allocated to a plurality of clusters.

In an embodiment, a ranging round may include a plurality of ranging slots. The ranging round may include a plurality of ranging slots allocated for each ranging message transmitted by the anchor devices belonging to the cluster associated with the ranging round. For example, if the first cluster includes one initiator anchor and three responder anchors, the ranging round for the first cluster may include a first ranging slot (e.g., ranging slot index 0) allocated for transmission/reception of the Poll message of the Initiator anchor included in the first cluster, a second ranging slot allocated for transmission/reception of the response message of the first Responder anchor, a third ranging slot allocated for transmission/reception of the response message of the second Responder anchor, a fourth ranging slot allocated for transmission/reception of the response message of the third Responder anchor, and a fifth ranging slot allocated for transmission/reception of the final message of the Initiator anchor.

In this scheme, ranging slots may be allocated to the ranging round for each cluster.

Through the ranging block structure as in the embodiment of FIG. 7B, the anchor devices of each cluster may exchange ranging messages in one cycle through their own ranging rounds in one ranging block, and the UE (tag device) may receive these ranging messages and calculate its position. Such an operation may be repeated for each ranging block. Thus, the location of the UE may be updated in the period of the ranging block.

Figure 8:
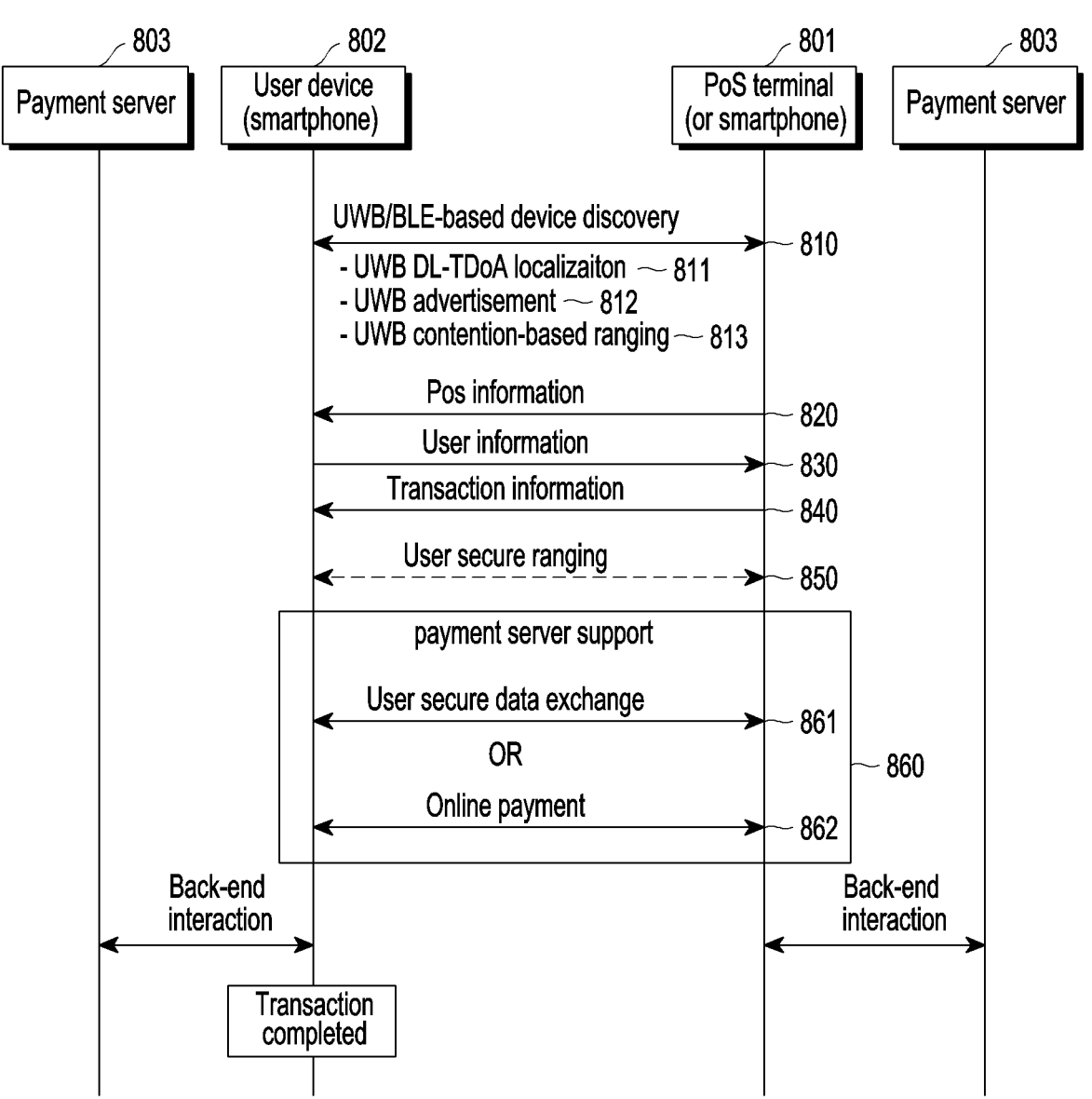
FIG. 8 illustrates a payment processing method using UWB according to an embodiment of the disclosure.

FIG. 8 illustrates a payment processing method using UWB according to an embodiment of the disclosure.

Referring to FIG. 8, payment processing using UWB may be performed by a payment terminal 801, a UE 802, and/or a payment server 803.

The payment terminal 801 may be an electronic device that communicates with the UE (or a UWB-enabled payment application of the UE) to perform electronic fund transfers. The payment terminal 801 may be, e.g., a point-of-service (PoS) terminal or smartphone supporting a payment processing function. In an embodiment, the payment terminal 801 may operate as a controller/initiator for TWR and/or a DT-anchor for DL-TDoA. The payment terminal 801 may have, e.g., all or some of the components of the UWB device of FIG. 1 or all or some of the components of the electronic device (e.g., the first electronic device or the second electronic device) of FIG. 2.

The UE 802 may be the user's electronic device that includes a UWB-enabled payment application. The UE 802 may be, e.g., the user's smartphone. In an embodiment, the UE 802 may act as a controlee/responder for TWR and/or as a DT-tag for DL-TDoA. The UE 802 may have, e.g., all or some of the components of the UWB device of FIG. 1 or all or some of the components of the electronic device (e.g., the first electronic device or the second electronic device) of FIG. 2.

The payment server 803 may be a backend server (system) that supports payment to the payment terminal 801 and/or the UE 802, such as an acquirer and an issuer.

Referring to FIG. 8, The payment processing method using UWB includes a UWB/BLE-based device discovery operation 810, a payment terminal information transmission operation 820, a user information transmission operation 830, a transaction information transmission operation 840, a UWB secure ranging operation 850 and/or a payment operation 860. However, according to an embodiment, some steps may be omitted, a plurality of steps may be merged into one step, or additional steps may be further performed. Further, the steps may be performed in an order different from the order shown. For example, the transaction information transmission operation 840 may be performed after the UWB secure ranging operation 850. For example, the UWB secure ranging operation 850 may be omitted.

UWB/BLE-Based Device Discovery Operation 810

In an embodiment, the UWB/BLE-based device discovery operation 810 may include a BLE advertisement operation.

As an embodiment, the BLE advertisement operation may include an operation in which the payment terminal 801, as a BLE advertiser, transmits a BLE advertisement packet to the UE. As an embodiment, the BLE advertisement packet may include at least one piece of information enabling the UE 802 to initiate at least one UWB operation. For example, the BLE advertisement packet may include a UWB payment identifier for identifying a supported payment service (or payment application). As an embodiment, at least one UWB operation that may be initiated based on reception of a BLE advertisement packet may include at least one of a DL-TDoA localization procedure 811, a UWB advertisement procedure 812, and contention-based ranging (UWB contention-based ranging) process 813.

In an embodiment, the DL-TDoA localization procedure 811 may be initiated according to the reception of a BLE advertisement packet or the execution of a UWB supporting payment application by user input.

The DL-TDoA localization procedure 811 may provide a DL-TDoA-based localization service to the UE 802. Thus, the UE 802 may estimate its position and perform a proximity-based payment transaction without exposing the position to the payment terminal 801.

As an embodiment, the DL-TDoA localization procedure 811 may include an operation for the payment terminal 801 to transmit a UWB message (e.g., the poll DTM, response DTM or final DTM) for DL-TDoA.

In an embodiment, the contention-based ranging procedure 813 may be initiated according to the reception of a BLE advertisement packet or the execution of a UWB supporting payment application by user input.

When the payment terminal 801 and the UE 802 do not know each other, it is not appropriate for the UE 802 to perform scheduling-based ranging to respond to the UWB message (e.g., RIM) transmitted by the payment terminal 801. Therefore, in order for the UE 802 to respond to the UWB message transmitted by the payment terminal 801, contention-based ranging needs to be performed.

As an embodiment, the contention-based ranging procedure 813 may include an operation for the payment terminal 801 transmitting a control message for contention-based ranging. The control message may include information about the CAP for contention-based access of the UE 802.

As an embodiment, the control message (information) for contention-based ranging, together with the message (information) for DL-TDoA, may be transmitted through one combined UWB message.

As an embodiment, in the contention-based ranging procedure 813, the UE 802 may respond to the UWB message transmitted by the payment terminal 801 when a preset condition is met. For example, when the distance between the UE 802 and the payment terminal 801 is identified as being less than or equal to a preset distance based on the result obtained by the DL-TDoA localization procedure 811, the UE 802 may transmit a response message (e.g., RRM) to the payment terminal 801. As an embodiment, the UE 802 may transmit a response message in any slot within the CAP set by the payment terminal 801.

In an embodiment, the UWB advertisement procedure 812 may be initiated according to the reception of a BLE advertisement packet or the execution of a UWB supporting payment application by user input. In the UWB advertisement procedure 812, the payment terminal 801 may transmit a UWB advertisement message (signal). The UE 802 may measure the AoA value for the received UWB advertisement message. Based on the measured AoA value, the user's intent for payment processing may be detected. For example, a gesture (tilt UX) in which the user points the UE 802 toward the payment terminal 801 may be preset as a gesture for expressing the user's intention to start payment processing. When this gesture is taken, the AoA value for the UWB advertisement message received from the payment terminal 801 may be measured as almost zero. Thus, in this scenario, when the AoA value is measured as close to zero, the UE 802 may identify that there is the user intent to initiate the payment process.

Payment Terminal Information Transmission Operation 820

In an embodiment, the payment terminal information transmission operation 820 may include an operation for the payment terminal 801 transmitting the payment terminal information to the UE 802. The payment terminal information may be referred to as PoS information.

As an embodiment, the payment terminal information may be included in a control message for contention-based ranging and transmitted from the payment terminal 801 to the UE 802. As an embodiment, the payment terminal information may be included in a message for DL-TDoA (e.g., the poll DTM, response DTM, or final DTM) and transmitted from the payment terminal 801 to the UE 802. As an embodiment, the payment terminal information may be included in a UWB message in which a control message for contention-based ranging and a message for DL-TDoA are combined and be transmitted from the payment terminal 801 to the UE 802. Thus, the payment terminal information may be transmitted through UWB in-band.

As an embodiment, the payment terminal information may include identification information (e.g., an identifier) about the payment terminal 901 (or a store associated with the payment terminal 901), name information (e.g., a nickname) about the payment terminal 901 (or a store associated with the payment terminal 901), and/or random challenge information (posChallenge) about the payment terminal 901 for mutual authentication. The identification information about the payment terminal may be a string based on object identifier (OID) or a universally unique identifier (UUID). The identification information about the payment terminal may be an identification number of a store managed by a server interworking with the store, or identification information about a PoS device or terminal in a specific store. The random challenge information (posChallenge) about the payment terminal 901 may be a random value (e.g., random number) generated by the payment terminal 901 used for mutual authentication of a random challenge scheme.

User Information Transmission Operation 830

In an embodiment, the user information transmission operation 830 may include an operation for the UE 802 transmitting the user information to the payment terminal 801.

As an embodiment, the user information may be included in a response message (e.g., RRM for SS-TWR) transmitted from the UE 802 to the payment terminal 801 in the contention-based ranging procedure 813 and be transmitted. Thus, the user information may be transmitted through UWB in-band.

As an embodiment, the user information may include identification information (e.g., an identifier) about the UE 902 (or the user of the UE 902), name information (e.g., a nickname) about the UE 902 (or the user of the UE 902), and/or random challenge information (userChallenge) about the UE 902 for mutual authentication. The identification information about the UE may be a string based on object identifier (OID) or a universally unique identifier (UUID). The UE's identification information is a user-specific number managed by a payment-related application (e.g., a 3rd party app such as Samsung Pay app, Coupang app, Baedal Minjok, or SSG). The user identification information may be an identifier of the subscriber identification module (SIM) managed by the communication company. The random challenge information (userChallenge) about the UE 902 may be a random value (e.g., random number) generated by the UE 902 used for mutual authentication of a random challenge scheme.

Transaction Information Transmission Operation 840

In an embodiment, the transaction information transmission operation 840 may include an operation for the payment terminal 801 transmitting the transaction information to the UE (or a UWB-enabled payment application of the UE 802).

As an embodiment, the transaction information may be transmitted via UWB data messages (data frames).

As an embodiment, the transaction information may be payment-related private information, such as the store name and the transaction amount transmitted from the payment terminal 801 to the UE 802. The transaction information may include transaction-related information (transaction date, card name, card number, approval number) which is entered in a typical card transaction statement.

As an embodiment, the transaction information transmission operation 840 may be performed after a secure channel (session) is established. For example, the transaction information transmission operation 840 may be performed after a secure session is established through a UWB secure ranging procedure 850.

UWB Secure Ranging Operation 850

In an embodiment, the UWB secure ranging operation 850 may include a procedure of performing secure ranging between the payment terminal 801 and the UE 802 using STS (e.g., dynamic STS). Thus, a secure session may be configured between the payment terminal 801 and the UE 802.

As an embodiment, the UWB secure ranging operation 850 may be an optional step.

Payment Operation 860

In an embodiment, the payment operation 860 may include a procedure 861 in which the UE 802 and the payment terminal 801 exchange UWB secure data including payment information.

As an embodiment, the payment information may be transmitted via UWB data messages (data frames).

As an embodiment, the payment information may be private information related to payment, such as a card number transmitted from the UE 802 to the payment terminal 801. The transaction information may include transaction-related information (transaction date, card name, card number, approval number) which is entered in a typical card transaction statement. As an embodiment, in the procedure 861 of exchanging UWB secure data, the payment information may be encrypted and transmitted through a secure channel.

In an embodiment, the payment operation 860 may include a procedure 862 in which the UE 802 and the payment terminal 801 perform an online payment.

The payment terminal 801 and/or the UE 802 may perform back-end interaction with the payment server 803 using the information exchanged through the payment operation 860 to thereby complete the transaction.

Hereinafter, a method for performing both a contention-based ranging procedure and a DL-TDoA procedure and a UWB message format therefor are described.

Figure 9:
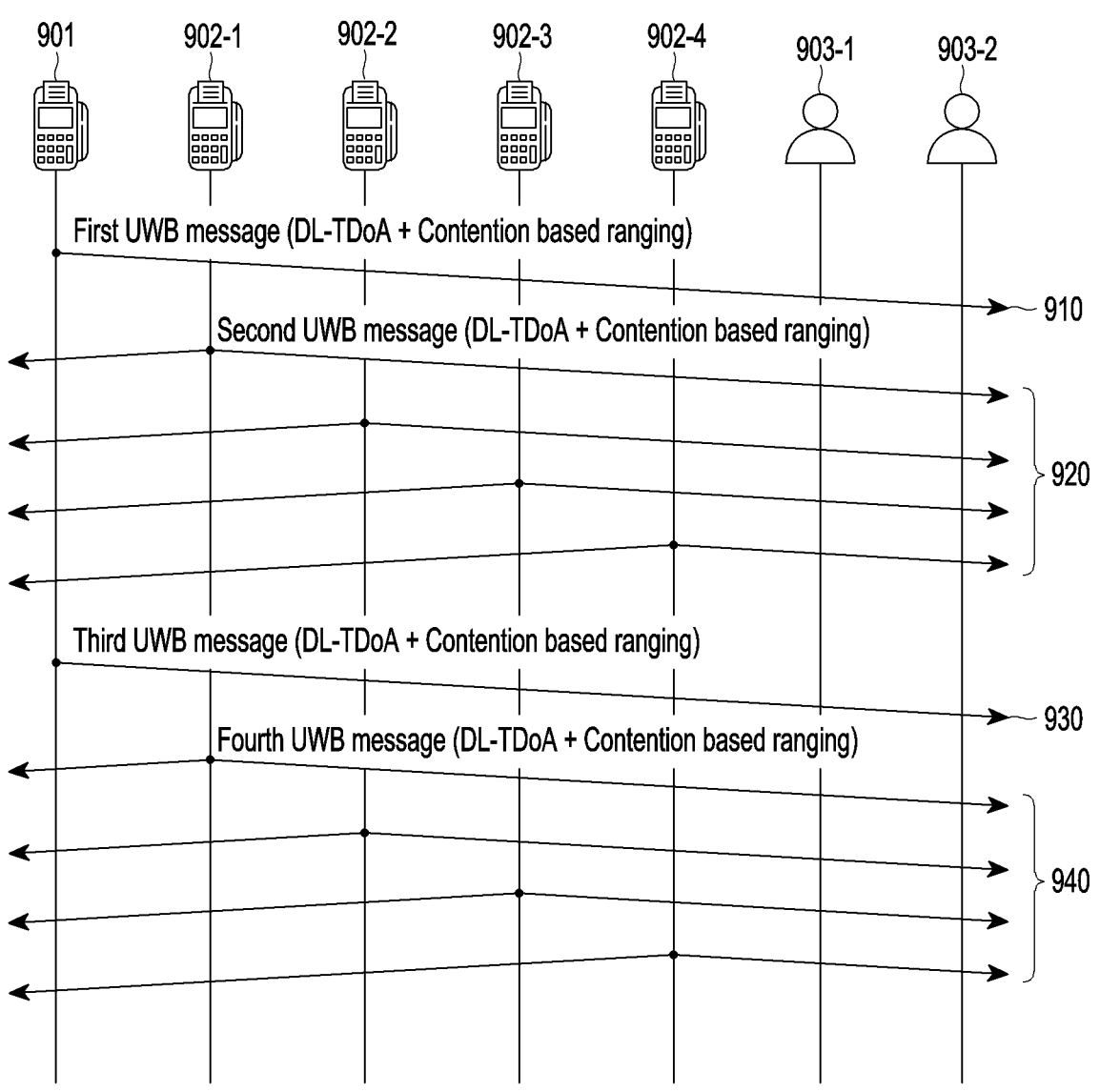
FIG. 9 illustrates a method for performing DL-TDoA ranging and contention-based ranging by a UWB device according to an embodiment of the disclosure.

FIG. 9 illustrates a method for performing DL-TDoA ranging and contention-based ranging by a UWB device according to an embodiment of the disclosure.

The ranging procedure of the embodiment of FIG. 9 may be a ranging procedure in which DL-TDoA ranging and contention-based ranging are performed together.

As compared to the DL-TDoA procedure of FIG. 7A, in the ranging procedure of the embodiment of FIG. 9, each responder anchor may transmit the response DTM (second DTM) twice in one ranging cycle (DL-TDoA ranging cycle).

As compared to the DL-TDoA of FIG. 7A, the UWB message used in the ranging procedure of the embodiment of FIG. 9 may include both a payload IE for contention-based ranging and a payload IE for DL-TDoA.

In the embodiment of FIG. 9, for convenience of description, it is assumed that five anchors including one initiator anchor 901 and four responder anchors 902-1 to 902-4 and two UEs 903-1 and 903-2 perform a ranging procedure, but embodiments are not limited thereto. For example, a different number of anchors and UEs than those illustrated may participate in the ranging procedure.

In an embodiment, the initiator anchor 901 may be a payment terminal (e.g., the payment terminal 801 of FIG. 8) for a UWB-based payment service. As an embodiment, the initiator anchor 901 may serve as a controller/initiator for contention-based ranging (TWR) and a DT-anchor (e.g., initiator DT-anchor) for DL-TDoA (OWR).

In an embodiment, the responder anchors 902-1, 902-2, 902-3, and 902-4 may be payment terminals (e.g., the payment terminal 801 of FIG. 8) for UWB-based payment services. As an embodiment, the responder anchors 902-1, 902-2, 902-3, and 902-4 may serve as controllers/initiators for contention-based ranging (TWR) and DT-anchors (e.g., responder DT-anchors) for DL-TDoA (OWR).

In an embodiment, the UEs 903-1 and 903-2 may be UEs (e.g., the UE 902 of FIG. 8) for UWB-based payment services. As an embodiment, the UEs 903-1 and 903-2 may serve as controlees/responders for contention-based ranging (TWR) and DT-tags for DL-TDoA (OWR).

In an embodiment, the ranging procedure of the embodiment of FIG. 9 may be performed in one ranging round. For example, operations 910 to 940 of FIG. 9 may be performed in one ranging round.

Referring to FIG. 9, in operation 910, the initiator anchor 901 may transmit or broadcast a first UWB message to initiate a ranging procedure. The first UWB message may be used to provide both the RIM function for contention-based ranging and the poll DTM function for DL-TDoA. Further, the first UWB message may be used for UWB advertisement for tilt UX. Further, the first UWB message may be used for transmitting payment terminal information. The first UWB message may be referred to as an initiation message, a first DTM, or a poll DTM.

In an embodiment, the first UWB message may include both a payload IE for contention-based ranging and a payload IE for DL-TDoA.

In an embodiment, the payload IE for contention-based ranging in the first UWB message may include data of a control message for contention-based ranging. As an embodiment, the control message for contention-based ranging may be a control message type 2. As an embodiment, the control message may include information indicating the size of the CAP (CAP size information).

In an embodiment, the payload IE for DL-TDoA in the first UWB message may include data of the poll DTM. As an embodiment, the payload IE for DL-TDoA in the first UWB message may include scheduling information for each responder anchor 902-1, 902-2, 902-3, and 902-4.

In operation 920, each of the responder anchors 902-1, 902-2, 902-3, and 902-4 may transmit or broadcast a second UWB message in response to the first UWB message. The first UWB message may be used to provide both the RIM function for contention-based ranging and the response DTM function for DL-TDoA. Further, the second UWB message may be used for UWB advertisement for tilt UX. Further, the second UWB message may be used for transmitting payment terminal information. The second UWB message may be referred to as a first response message, a second DTM, or a response DTM.

In an embodiment, each responder anchor 902-1, 902-2, 902-3, and 902-4 may transmit or broadcast a second UWB message in its own ranging slot based on the first scheduling information in the first UWB message.

In an embodiment, the second UWB message may include both a payload IE for contention-based ranging and a payload IE for DL-TDoA.

In an embodiment, the payload IE for contention-based ranging in the second DTM message may include data of a control message for contention-based ranging. As an embodiment, the control message (CM) for contention-based ranging may be a control message type 2. As an embodiment, the control message for contention-based ranging in the second DTM may be a synchronized control message.

As an embodiment, the synchronized control message may be a control message synchronized with the control message included in the first UWB message transmitted by the initiator anchor 901 in operation 910.

As an embodiment, the synchronized control messages may set the CAPs for contention-based ranging to the same time duration. In other words, that the control messages are synchronized with each other may mean that the CAPs configured by the synchronized control messages have the same time duration. For example, when the CAP set by the control message included in the first control message is set to a period corresponding to ranging slot #11 to ranging slot #20, control messages synchronized with the control message included in the first control message messages may also set the CAPs to the period corresponding to ranging slot #11 to ranging slot #20. Through the synchronized control messages, the CAPs set by the control messages may be set to the same time duration without colliding with each other.

Hereinafter, synchronization of control messages is described as an example.

The control message included in the first UWB message may include CAP size information. The CAP size information may designate the size of the CAP through which the UEs 903-1 and 903-2 may make a contention-based response.

The CAP having the size of the CAP may be set to a time after the time when the initiator anchor 901 and the responder anchors 902-1 to 902-4 transmit all of the UWB messages for DL-TDoA, that is, the time when operation 940 is complete.

When it is assumed that operation 940 ends at ranging slot #10 and the size of the CAP designated by the CAP size information about the control message in the first UWB message is 10, the CAP set by the control message in the first UWB message may be set to a time duration (e.g., a period from ranging slot #11 to ranging slot #20) including 10 ranging slots after ranging slot #10. In this case, the CAP set by the second UWB message having the control message synchronized with the control message in the first UWB message should also be set to a time duration (e.g., a ranging slot period from ranging slot #11 to ranging slot #20) including 10 ranging slots after ranging slot #10. Therefore, the value of the size of the CAP set by the control message in the first UWB message and the index values of the ranging slots included in the CAP should be equal to the value of the size of the CAP set by the synchronized control message in the second UWB message and the index values of the ranging slots included in the CAP. Through these synchronized control messages, time durations for which the UEs 903-1 and 903-2 may make contention-based responses may all be set to have the same time period without collision.

Hereinafter, a method for setting synchronized control messages is described as an example.

For example, when it is assumed that there is one initiator anchor and three responder anchors, the four anchors each transmit two UWB messages (DTMs) referring to FIG. 9, and the CAP size is five, a method for configuring synchronized control messages is as follows.

In ranging slot #0, the initiator anchor transmits a first UWB message (initiation message).

In ranging slots #1, #2, and #3, the responder anchors each transmit a second UWB message (first response message).

In ranging slot #4, the initiator anchor transmits a third UWB message (final message).

In ranging slots #5, #6, and #7, the responder anchors each transmit a fourth UWB message (second response message).

By randomly selecting one of the ranging slots #8, #9, #10, #11, and #12, UEs may attempt a contention-based response.

In this scenario, when the initiator anchor transmits the first UWB message in ranging slot #0, the initiator anchor may set the value of CAP size information in the control message to 5 and set the value of responder management list size (RML size) information to 7. Thus, the UEs may skip 7 ranging slots corresponding to the value of 7 designated by the RML size information in ranging slot #0 where the initiator anchor transmitted the first UWB message, and then perform a contention-based response in five ranging slots corresponding to the value of 5 designated by the CAP size information from ranging slot #8. In other words, based on the CAP size information (=5) and the RML size information (=7) of the control message in the first UWB message, the UE may identify that the period corresponding to ranging slots #8, #9, #10, #11, and #12 is the CAP, and transmit a response message in any slot within the CAP.

Then, when the first responder anchor transmits the second message in ranging slot #1, the first responder anchor may equally set the value of CAP size information in the control message to 5 and set the value of RML size information to 6. Thus, the UEs may skip 6 ranging slots corresponding to the value of 6 designated by the RML size information from ranging slot #1 where the first responder anchor transmitted the second UWB message, and then perform a contention-based response in five ranging slots corresponding to the value of 5 designated by the CAP size information from ranging slot #8. In other words, the same CAP may be set through the control message of the initiator anchor and the synchronized control message of the first responder anchor.

Likewise, control messages in UWB messages transmitted by all other anchors may be set to designate the period corresponding to the same ranging slots #8, #9, #10, #11, and #12 as the CAP, so that the control messages may be synchronized with each other.

In an embodiment, the payload IE for DL-TDoA in the second UWB message may include data of the response DTM. As an embodiment, the payload IE for DL-TDoA in the second UWB message may include first reply time information. The first reply time information about the corresponding responder anchor may include a first responder reply time indicating the elapsed time between the time when the corresponding responder anchor receives the first UWB message and the time when the second UWB message is transmitted. Further, the second UWB message may further include information about additional reply time(s). An example of reply times included in the second UWB message is described below with reference to FIG. 15.

In operation 930, the initiator anchor 901 may transmit or broadcast a third UWB message in response to the second UWB message from the responder anchors 902-1, 902-2, 902-3, and 902-4. The third UWB message may be used to provide both the RIM function for contention-based ranging and the final DTM function for DL-TDoA. Further, the third UWB message may be used for UWB advertisement for tilt UX. Further, the third UWB message may be used for transmitting payment terminal information. The third UWB message may be referred to as a final message, a third DTM, or a final DTM.

In an embodiment, the third UWB message may include both a payload IE for contention-based ranging and a payload IE for DL-TDoA.

In an embodiment, the payload IE for contention-based ranging in the third UWB message may include data of a control message for contention-based ranging. As an embodiment, the control message for contention-based ranging in the third DTM may be a synchronized control message. Synchronization of the control message may refer to the description of operation 920.

In an embodiment, the payload IE for DL-TDoA in the third UWB message may include data of the final DTM. As an embodiment, the payload IE for DL-TDoA in the third UWB message may include second reply time information. The second reply time information may include a list of reply times for second UWB messages from the responder anchor 902-1, 902-2, 902-3, and 902-4, respectively. The reply time for the second UWB message may be the elapsed time between the time when the initiator anchor 901 receives the second UWB message from the corresponding responder anchor and the time when the third UWB message is transmitted. Further, the third UWB message may further include information about additional reply time(s). An example of reply times included in the third UWB message is described below with reference to FIG. 15.

In operation 940, each of the responder anchors 902-3, 902-4, 902-3, and 902-4 may transmit or broadcast a fourth UWB message in response to the third UWB message. The fourth UWB message may be used to provide both the RIM function for contention-based ranging and the response DTM function for DL-TDoA. Further, the fourth UWB message may be used for UWB advertisement for tilt UX. Further, the fourth UWB message may be used for transmitting payment terminal information. As an embodiment, the message format of the fourth UWB message may be the same as that of the second UWB message. The fourth UWB message may be referred to as a second response message, a second DTM, or a response DTM.

In an embodiment, each responder anchor 902-1, 902-4, 902-3, and 902-4 may transmit or broadcast a second UWB message in its own ranging slot based on the second scheduling information in the first UWB message.

In an embodiment, the fourth UWB message may include both a payload IE for contention-based ranging and a payload IE for DL-TDoA.

In an embodiment, the payload IE for contention-based ranging in the fourth UWB message may include data of a control message for contention-based ranging. As an embodiment, the control message (CM) for contention-based ranging may be a control message type 2. As an embodiment, the control message for contention-based ranging in the fourth DTM may be a synchronized control message. Synchronization of the control message may refer to the description of operation 920.

In an embodiment, the payload IE for DL-TDoA in the fourth UWB message may include data of the response DTM. As an embodiment, the payload IE for DL-TDoA in the fourth UWB message may include third reply time information. The third reply time information about the corresponding responder anchor may include a second responder reply time indicating the elapsed time between the time when the corresponding responder anchor receives the third UWB message and the time when the fourth UWB message is transmitted. Further, the fourth UWB message may further include information about additional reply times. An example of reply times included in the fourth UWB message is described below with reference to FIG. 15.

In an embodiment, the UEs 903-1 and 903-2 may receive a first UWB message, a second UWB message, a third UWB message, and a fourth UWB message, calculate the TDoA based on the payload IE for DL-TDoA in each UWB message, and estimate their position based on the calculated TDoA.

Meanwhile, in the case of the embodiment of FIG. 7A, in one DL-TDoA ranging cycle, the initiator anchor transmits two DTMs, but the responder anchors may transmit only one DTM. Therefore, in the case of the embodiment of FIG. 7A, it is difficult for the UE to estimate CFOs for responder anchors.

However, in the case of the embodiment of FIG. 9, all anchors transmit two or more DTMs (UWB messages) in one DL-TDoA ranging cycle. Therefore, the UE may receive two or more DTMs from each anchor. As a result, the UE may estimate the clock frequency offset (CFO) for any anchor based on two or more DTMs received from each anchor. Further, since each anchor transmits two or more DTMs, the possibility of the UE obtaining TDoA may be increased.

Further, in the case of the embodiment of FIG. 9, the UWB message used in the ranging procedure includes the payload IE for contention-based ranging as well as the payload IE for DL-TDoA. Accordingly, in one ranging cycle (ranging round), DL-TDoA ranging and contention-based ranging may be performed together. This may increase the efficiency of resource use.

Figure 10:
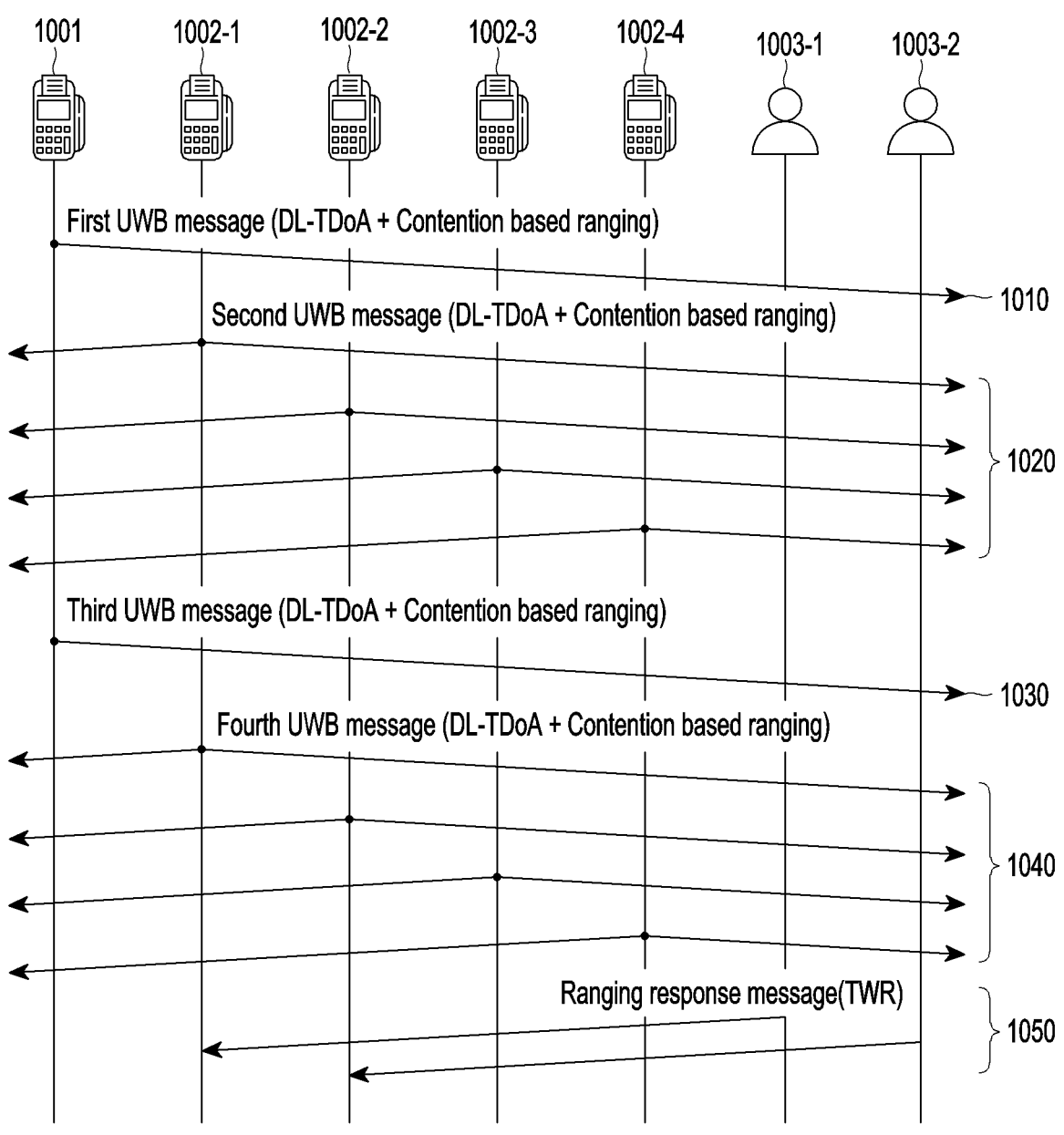
FIG. 10 illustrates a method for performing DL-TDoA ranging and contention-based ranging by a UWB device according to an embodiment of the disclosure.

FIG. 10 illustrates a method for performing DL-TDoA ranging and contention-based ranging by a UWB device according to an embodiment of the disclosure.

The ranging procedure of the embodiment of FIG. 10 may be a ranging procedure in which DL-TDoA ranging and contention-based ranging are performed together.

As compared to the DL-TDoA procedure of FIG. 7A, in the ranging procedure of the embodiment of FIG. 10, each responder anchor may transmit the response DTM (second DTM) twice in one ranging cycle (DL-TDoA ranging cycle).

As compared to the DL-TDoA of FIG. 7A, the UWB message used in the ranging procedure of the embodiment of FIG. 10 may include both a payload IE for contention-based ranging and a payload IE for DL-TDoA.

In the embodiment of FIG. 10, for convenience of description, it is assumed that five anchors including one initiator anchor 1001 and four responder anchors 1002-1 to 1002-4 and two UEs 1003-1 and 1003-2 perform a ranging procedure, but embodiments are not limited thereto. For example, a different number of anchors and UEs than those illustrated may participate in the ranging procedure.

In an embodiment, the initiator anchor 1001 may be a payment terminal (e.g., the payment terminal 801 of FIG. 8) for a UWB-based payment service. As an embodiment, the initiator anchor 1001 may serve as a controller/initiator for contention-based ranging (TWR) and a DT-anchor (e.g., initiator DT-anchor) for DL-TDoA (OWR).

In an embodiment, the responder anchors 1002-1, 1002-2, 1002-3, and 1002-4 may be payment terminals (e.g., the payment terminal 801 of FIG. 8) for UWB-based payment services. As an embodiment, the responder anchors 1002-1, 1002-2, 1002-3, and 1002-4 may serve as controllers/initiators for contention-based ranging (TWR) and DT-anchors (e.g., responder DT-anchors) for DL-TDoA (OWR).

In an embodiment, the UEs 1003-1 and 1003-2 may be UEs (e.g., the UE 1002 of FIG. 8) for UWB-based payment services. As an embodiment, the UEs 1003-1 and 1003-2 may serve as controlees/responders for contention-based ranging (TWR) and DT-tags for DL-TDoA (OWR).

In an embodiment, the ranging procedure of the embodiment of FIG. 10 may be performed in one ranging round. For example, operations 1010 to 1050 of FIG. may be performed in one ranging round. Meanwhile, operations 1010 to 1040 of FIG. 10 may correspond to operations 9010 to 9040 of FIG. 9. Accordingly, descriptions of operations 1010 to 1040 of FIG. 10 may refer to descriptions of operations 9010 to 9040 of FIG. 9.

Referring to FIG. 10, in operation 1010, the initiator anchor 1001 may transmit or broadcast a first UWB message to initiate a ranging procedure. The first UWB message may be used to provide both the RIM function for contention-based ranging and the poll DTM function for DL-TDoA. The first UWB message may be referred to as an initiation message, a first DTM, or a poll DTM.

In an embodiment, the first UWB message may include both a payload IE for contention-based ranging and a payload IE for DL-TDoA.

In an embodiment, the payload IE for contention-based ranging in the first UWB message may include data of a control message for contention-based ranging. As an embodiment, the control message for contention-based ranging may be a control message type 2. As an embodiment, the control message may include information indicating the size of the CAP (CAP size information).

In an embodiment, the payload IE for DL-TDoA in the first UWB message may include data of the poll DTM. As an embodiment, the payload IE for DL-TDoA in the first UWB message may include scheduling information for each responder anchor 1002-1, 1002-2, 1002-3, and 1002-4.

In operation 1020, each of the responder anchors 1002-1, 1002-2, 1002-3, and 1002-4 may transmit or broadcast a second UWB message in response to the first UWB message. The first UWB message may be used to provide both the RIM function for contention-based ranging and the response DTM function for DL-TDoA. The second UWB message may be referred to as a first response message, a second DTM, or a response DTM.

In an embodiment, each responder anchor 1002-1, 1002-2, 1002-3, and 1002-4 may transmit or broadcast a second UWB message in its own ranging slot based on the first scheduling information in the first UWB message.

In an embodiment, the second UWB message may include both a payload IE for contention-based ranging and a payload IE for DL-TDoA.

In an embodiment, the payload IE for contention-based ranging in the second DTM message may include data of a control message for contention-based ranging. As an embodiment, the control message (CM) for contention-based ranging may be a control message type 2. As an embodiment, the control message for contention-based ranging in the second DTM may be a synchronized control message.

As an embodiment, the synchronized control message may be a control message synchronized with the control message included in the first UWB message transmitted by the initiator anchor 1001 in operation 1010.

As an embodiment, the synchronized control messages may set the CAPs for contention-based ranging to the same time duration. In other words, that the control messages are synchronized with each other may mean that the CAPs configured by the synchronized control messages have the same time duration. For example, when the CAP set by the control message included in the first control message is set to a period corresponding to ranging slot #11 to ranging slot #20, control messages synchronized with the control message included in the first control message messages may also set the CAPs to the period corresponding to ranging slot #11 to ranging slot #20. Through the synchronized control messages, the CAPs set by the control messages may be set to the same time duration without colliding with each other. Synchronization of the control message may refer to the description of operation 920 of FIG. 9.

In an embodiment, the payload IE for DL-TDoA in the second UWB message may include data of the response DTM. As an embodiment, the payload IE for DL-TDoA in the second UWB message may include first reply time information. The first reply time information about the corresponding responder anchor may include a first responder reply time indicating the elapsed time between the time when the corresponding responder anchor receives the first DTM and the time when the second DTM is transmitted. Further, the second UWB message may further include information about additional reply time(s). An example of reply times included in the second UWB message is described below with reference to FIG. 15.

In operation 1030, the initiator anchor 1001 may transmit or broadcast a third UWB message in response to the second UWB message from the responder anchors 1002-1, 1002-2, 1002-3, and 1002-4. The third UWB message may be used to provide both the RIM function for contention-based ranging and the final DTM function for DL-TDoA. The third UWB message may be referred to as a final message, a third DTM, or a final DTM.

In an embodiment, the third UWB message may include both a payload IE for contention-based ranging and a payload IE for DL-TDoA.

In an embodiment, the payload IE for contention-based ranging in the third UWB message may include data of a control message for contention-based ranging. As an embodiment, the control message for contention-based ranging in the third DTM may be a synchronized control message. Synchronization of the control message may refer to the description of operation 920 of FIG. 9.

In an embodiment, the payload IE for DL-TDoA in the third UWB message may include data of the final DTM. As an embodiment, the payload IE for DL-TDoA in the third UWB message may include second reply time information. The second reply time information may include a list of reply times for second DTMs from the responder anchor 1002-1, 1002-2, 1002-3, and 1002-4, respectively. The reply time for the second DTM may be the elapsed time between the time when the initiator anchor 1001 receives the second DTM from the corresponding responder anchor and the time when the third DTM is transmitted. Further, the third UWB message may further include information about additional reply time(s). An example of reply times included in the third UWB message is described below with reference to FIG. 15.

In operation 1040, each of the responder anchors 1002-3, 1002-4, 1002-3, and 1002-4 may transmit or broadcast a second UWB message in response to the first UWB message. The fourth UWB message may be used to provide both the RIM function for contention-based ranging and the response DTM function for DL-TDoA. As an embodiment, the message format of the fourth UWB message may be the same as that of the second UWB message. The fourth UWB message may be referred to as a second response message, a second DTM, or a response DTM.

In an embodiment, each responder anchor 1002-1, 1002-4, 1002-3, and 1002-4 may transmit or broadcast a second UWB message in its own ranging slot based on the second scheduling information in the first UWB message.

In an embodiment, the fourth UWB message may include both a payload IE for contention-based ranging and a payload IE for DL-TDoA.

In an embodiment, the payload IE for contention-based ranging in the fourth UWB message may include data of a control message for contention-based ranging. As an embodiment, the control message (CM) for contention-based ranging may be a control message type 2. As an embodiment, the control message for contention-based ranging in the fourth UWB message may be a synchronized control message. Synchronization of the control message may refer to the description of operation 920.

In an embodiment, the payload IE for DL-TDoA in the fourth UWB message may include data of the response DTM. As an embodiment, the payload IE for DL-TDoA in the fourth UWB message may include third reply time information. The third reply time information about the corresponding responder anchor may include a second responder reply time indicating the elapsed time between the time when the corresponding responder anchor receives the third DTM and the time when the fourth DTM is transmitted. Further, the fourth UWB message may further include information about additional reply times. An example of reply times included in the fourth UWB message is described below with reference to FIG. 15.

In an embodiment, the UEs 1003-1 and 1003-2 may receive a first UWB message, a second UWB message, a third UWB message, and a fourth UWB message, calculate the TDoA based on the payload IE for DL-TDoA in each UWB message, and estimate their position based on the calculated TDoA.

In operation 1050, each UE 1003-1 and 1003-2 may transmit a ranging response message (e.g., RRM for SS-TWR) for contention-based ranging to the selected anchor. Upon receiving the response message from the UE, the anchor may perform SS-TWR operation based on the ranging response message. Thus, the anchor may obtain an accurate distance to the UE. The ranging response message may be referred to as a fifth UWB message or an extended ranging response message (extended RRM).

In an embodiment, the UE 1003-1 and 1003-2 may select one of anchors 1001 and 1002-1 to 1002-4 based on preset criteria. For example, based on the DL-TDoA result, the UE 1003-1 or 1003-2 may select an anchor whose distance from its position is within a preset distance (e.g., 2 meters). When there are a plurality of anchors positioned within the preset distance, the UE may select the anchor with the closest distance among the plurality of anchors.

In an embodiment, the UEs 1003-1 and 1003-2 may transmit a ranging response message in any ranging slot within the CAP. As an embodiment, the CAPs may be set through the control message in the first UWB message, the synchronized control message in the second UWB message, the synchronized control message in the third UWB message, and the synchronized control message in the fourth UWB message. The CAPs set through synchronized control messages may have the same time duration.

In an embodiment, the ranging response message may include user information. Thus, the user information may be transmitted in UWB in-band. For example, the ranging response message may include challenge information (user challenge) about the UE.

In an embodiment, the ranging response message may include two pieces of reply time information for the selected anchor. These two pieces of reply time information may be used to correct the CFO in the corresponding anchor.

Meanwhile, in the case of the embodiment of FIG. 7A, in one DL-TDoA ranging cycle, the initiator anchor transmits two DTMs, but the responder anchors may transmit only one DTM. Therefore, in the case of the embodiment of FIG. 7A, it is difficult for the UE to estimate CFOs for responder anchors.

However, in the case of the embodiment of FIG. 10, all anchors transmit two or more DTMs (UWB messages) in one DL-TDoA ranging cycle. Therefore, the UE may receive two or more DTMs from each anchor. As a result, the UE may estimate the clock frequency offset (CFO) for any anchor based on two or more DTMs received from each anchor. Further, since each anchor transmits two or more DTMs, the possibility of the UE obtaining TDoA may be increased.

Further, in the case of the embodiment of FIG. 10, the UWB message used in the ranging procedure includes the payload IE for contention-based ranging as well as the payload IE for DL-TDoA. Accordingly, in one ranging cycle (ranging round), DL-TDoA ranging and contention-based ranging may be performed together. This may increase the efficiency of resource use.

FIG. 11 illustrates a structure of a UWB message according to an embodiment of the disclosure.

In the embodiment of FIG. 11, the UWB message may be an example of the UWB message used in the ranging procedure of FIGS. 9 and 10. For example, the UWB message of FIG. 11 may be an example of the first to fourth UWB messages used in the ranging procedure of FIGS. 9 and 10.

Referring to FIG. 11, the UWB message includes a MAC header 1110, a MAC payload including a payload IE 1120-1 for contention-based ranging and a payload IE 1120-2 for DL-TDoA, and a MAC footer 1130 including an FCS.

In an embodiment, the MAC header 1110 may include all or some of the fields included in the MAC header of FIG. 3.

In an embodiment, the payload IE 1120-1 for contention-based ranging may include data of the control message for contention-based ranging. As an embodiment, the control message for contention-based ranging may include information indicating the size of the CAP, information about the transmission (Tx) offset, and/or responder management list (RML)-related configuration information.

In an embodiment, the payload IE 1120-2 for DL-TDoA may include all or some of the fields included in any one of the payload IE of the poll DTM, the payload IE of the responder DTM, or the payload IE of the final DTM.

An example of the payload (MAC payload) including the payload IE 1120-1 for contention-based ranging and the payload IE 1120-2 for DL-TDoA is described below with reference to FIGS. 12A and 12B.

FIG. 12A illustrates a payload structure of a UWB message according to an embodiment of the disclosure.

In the embodiment of FIG. 12A, the payload of the UWB message may be an example of the payload (MAC payload) of the UWB message of FIG. 11.

Referring to FIG. 12A, the UWB message (or payload of the UWB message) may include a payload IE 1220-1 for contention-based ranging and a payload IE 1220-2 for DL-TDoA. The payload IE 1220-1 for contention-based ranging may be an example of the payload IE 1120-1 for contention-based ranging in FIG. 11. The payload IE 1220-2 for DL-TDoA may be an example of the payload IE 1120-2 for DL-TDoA of FIG. 11.

In the embodiment of FIG. 12A, the payload IE 1220-1 for contention-based ranging may precede the payload IE 1220-2 for DL-TDoA.

Payload IE 1220-1 for Contention-Based Ranging

The payload IE 1220-1 for contention-based ranging may include a control message for contention-based ranging. As an embodiment, the control message for contention-based ranging may be a control message type 2.

In an embodiment, the payload IE 1220-1 for contention-based ranging (or a control message for contention-based ranging) may include a UWB message ID field, a message control field, a striding length field, an RML size field, and/or or an RML field.

The UWB message ID field may identify the UWB message. In the case of the payload IE 1210$a$ for contention-based ranging, the UWB ID field may be set to a value designating the control message.

The message control field may set parameters used for contention-based ranging with responders participating in contention-based ranging. As an embodiment, the message control field may include CAP size information (field) designating the size of the contention period in units of ranging slots used in the CAP. Through the CAP size information, the number of ranging slots in which the UE may make a contention-based response may be designated. Table 1 below may illustrate an example of the message control fields.

TABLE 1

| Parameter | Size (bits) | Notes |
|---|---|---|
| CAP Size | 8 | Size of the contention period in ranging slots used in the CAP |
| Measurement Report Phase Control | 1 | 0: MRP is not present<br>1: MRP is present<br>This is applicable only if DS-TWR ranging round is used in Contention-based ranging |
| RFU | 1 | RFU |
| Number of Tx Offsets | 2 | Number of Tx offsets within the ranging slot available for transmission of the message from the Responder<br>0b00 -No Tx offset allowed<br>0b01 - 2 Tx offsets<br>0b10 - 4 Tx offsets<br>0b11 - 8 Tx offsets |
| Hopping Mode | 1 | 0: The same ranging round will be used for the next ranging block<br>1: Ranging round which follows the hopping sequence will be used for the next ranging block. |
| Stop Ranging | 1 | 0: Ranging will be continued<br>1: Ranging will be stopped |
| RML Config | 2 | 0b00: Responder Management List is absent.<br>0b01: Responder Management List is present and contains the short MAC address of the responder(s).<br>0b10: Responder Management List is present and contains the extended MAC address of the responder(s).<br>0b11: RFU |
| Allowed Tx Offsets | 8 | Allowed Tx offsets for the Responder to transmit the message Where,<br>Bit 0 to Bit 7 represents the allowed Tx offsets within a ranging slot<br>Tx Offset bit<n> = n * ranging slot duration/Number of Tx Offsets<br>Bit<n> value set to 0 indicates that the Tx Offset <n> is not allowed to be used in the CAP slot for transmission of frame.<br>Bit<n> value set to 1 indicates that the Tx Offset <n> is allowed to be used in the CAP slot for transmission of frame.<br>This field is not applicable when Number of Tx Offsets is set to value "0b00".<br>This bitmap shall be consistent with Number of Tx Offsets:<br>if Number of Tx Offset = 0b01, only Bit<0> and Bit<1> are relevant<br>if Number of Tx Offsets = 0b10, only Bit<0> to Bit<3> are relevant. |

The striding length field may designate the number of ranging blocks to be skipped.

The RML size field may designate the size of RML.

The RML field may be a list including device MAC addresses of known responder(s). The RML field may include the number of RML elements corresponding to the size of the RML. Table 2 below illustrates an example of the RML elements included in the RML field. Referring to Table 2, each RML element may designate the MAC address of the corresponding responder.

TABLE 2

| Parameter | Size (octets) | Notes |
|---|---|---|
| Responder MAC Address | 2/8 | Device MAC Address of Responder |

For example, when a two-byte short MAC address is used and 5 responders are managed by the RML, the value of the RML size field may be set to 5, and the RML field may be data with a length of 10 bytes.

Referring to FIG. 9, a CAP where the UE may perform a contention-based response may be configured through the CAP size field and the RML size field included in the payload IE 1210a for contention-based ranging. Further, when control messages for contention-based ranging are synchronized with each other, the value of the CAP size field and the value of the RML size field may be set so that all of them set the same CAP. In this case, the value of the CAP size field may be the same in all synchronized control messages.

Payload IE 1220-2 for DL-TDoA

In an embodiment, the payload IE 1220-2 for DL-TDoA may include a UWB message ID field, an OWR message type field, and an OWR message type-dependent payload field.

The UWB message ID field may identify the UWB message. In the case of the payload IE 1220-2 for DL-TDoA, the UWB ID field may be set to a value designating the OWR message.

The OWR message type field may designate the type of OWR message. In the case of the payload IE 1220-2 for DL-TDoA, the OWR message type field may be set to a value designating one of the poll DTM, response DTM or final DTM.

The OWR message type-dependent payload field may include payload data according to the value designated by the OWR message type field. When the value set in the OWR message type field designates the poll DTM, response DTM or final DTM, that is, when DTM is designated, an example of the OWR message type-dependent payload field is described below with reference to FIGS. 13A and 13B.

FIG. 12B illustrates a payload structure of a UWB message according to an embodiment of the disclosure.

In the embodiment of FIG. 12B, the payload of the UWB message may be an example of the payload (MAC payload) of the UWB message of FIG. 11.

Referring to FIG. 12B, the UWB message (or payload of the UWB message) may include a payload IE 1220-1 for contention-based ranging and a payload IE 1220-2 for DL-TDoA. The payload IE 1220-1 for contention-based ranging may be an example of the payload IE 1120-1 for contention-based ranging in FIG. 11. The payload IE 1220-2 for DL-TDoA may be an example of the payload IE 1120-2 for DL-TDoA of FIG. 11.

Unlike the embodiment of FIG. 12A, in the embodiment of FIG. 12B, the payload IE 1220-1 for contention-based ranging may follow the payload IE 1220-2 for DL-TDoA.

Meanwhile, each field (information) included in the payload IE 1220-1 for contention-based ranging in the embodiment of FIG. 12B is the same as each field included in the payload IE 1220-1 for contention-based ranging in FIG. 12A. Accordingly, reference may be made to the description of FIG. 12A.

Further, each field (information) included in the payload IE 1220-2 for DL-TDoA of the embodiment of FIG. 12B is the same as each field (information) included in the payload IE 1220-2 for DL-TDoA of FIG. 12A. Accordingly, reference may be made to the description of FIG. 12A.

FIGS. 13A and 13B illustrate an example of an OWR message type-dependent payload field included in a UWB message according to various embodiments of the disclosure.

In the embodiment of FIGS. 13A and 13B, the OWR message type-dependent payload field of the UWB message may be an example of the OWR message type-dependent payload field of the payload IE 1220-2 for DL-TDoA of FIGS. 12A and 12B.

Referring to FIG. 13A, when the value set in the OWR message type field designates the poll DTM, response DTM, or final DTM, the OWR message type-dependent payload field may include a message control field, a round index field, a block index field, a transmission (Tx) timestamp field, and/or a responder DT-anchor management list field.

The message control field may include the settings of the corresponding DTM.

The round index field may designate the round index of the current ranging round.

The block index field may designate the block index of the current ranging block.

The transmission timestamp field may designate the transmission timestamp of the DTM expressed as either a local or common time base.

The responder DT-anchor management list field may include N responder DT-anchor management list elements. N may be determined by the value of the responder DT-anchor management list length field in the message control field. Each responder DT-anchor management list element may include a responder address field for the corresponding responder DT-anchor, a ranging slot index field, a second ranging slot index field, and/or a ToF result field. An example of the responder DT-anchor management list element is described below with reference to FIG. 13B.

Referring to FIG. 13B, the responder DT-anchor management list element may include a responder address field, a ranging slot index field, a second ranging slot index field, and/or a ToF result field.

The responder address field may designate the address (e.g., MAC address) of the responder DT-anchor (responder anchor).

The ranging slot index field may designate the ranging slot allocated to the responder DT-anchor (responder anchor) identified by the responder address field. As an embodiment, the ranging slot designated by the ranging slot index field may be used for the responder DT-anchor to transmit a first response message (e.g., the second UWB message of FIGS. 9 and 10) in response to the initiation message (e.g., the first UWB message of FIGS. 9 and 10) transmitted by the initiator DT-anchor (initiator anchor). In other words, the second ranging slot index field may be used for the responder anchor to transmit the first response message.

The second ranging slot index field may designate the ranging slot second allocated to the responder DT-anchor (responder anchor) identified by the responder address field. As an embodiment, the ranging slot designated by the second ranging slot index field may be used for the responder DT-anchor to transmit a second response message (e.g., the fourth UWB message of FIGS. 9 and 10) in response to the final message (e.g., the third UWB message of FIGS. 9 and 10) transmitted by the initiator DT-anchor (initiator anchor). In other words, the second ranging slot index field may be used for the responder anchor to transmit the second response message.

The ToF result field may include ToF as a result of SS-TWR with the responder DT-anchor identified by responder address field.

In an embodiment, the OWR message type-dependent payload field may further include a clock frequency offset (CFO) field designating a CFO with respect to the initiator anchor and/or a reply time field (e.g., reply time list field or responder reply time field) including information about at least one reply time.

FIG. 14 illustrates a UCI command for establishing a session for an initiator anchor according to an embodiment of the disclosure.

According to an embodiment, the initiator anchor (initiator DT-anchor) may use the DST_MAC_ADDRESS list designated using a UCI command.

The SESSION_SET_INITIATOR_DT_ANCHOR_RR_RDM_LIST_CMD command of FIG. 14 may be an example of the UCI command used to designate the DST_MAC_ADDRESS list. The SESSION_SET_INITIATOR_DT_ANCHOR_RR_RDM_LIST_CMD command may be transferred to the UWBS in the framework of the initiator anchor.

Referring to FIG. 14, the UCI command may include a session ID field, an RR_RDM count field in an RR_RDM_LIST field, and/or the RR_RDM_LIST field.

The session ID field may designate the session ID of the DL-TDoA session to be configured for the ranging round given the RDM list of the initiator DT-anchor.

The RR_RDM count field may designate the number of RR_RDMs in the RR_RDM_LIST field including ranging round indexes and corresponding DST_MAC_ADDRESS lists.

The RR_RDM_LIST field may include a ranging round index field, a destination MAC address count field, a responder slots field, and a DST_MAC_ADDRESS field.

The ranging round index field may designate the ranging round index where the DT-anchor operates as the initiator and the DST_MAC_ADDRESS list should be set.

The destination MAC address count field may designate the number N of destination MAC addresses for the designated ranging round index.

The responder slots field may designate the responder slot indexes allocated for responder transmissions. The first responder slots field may have a size of 1 octet, or N+1 octets or 2N+1 octets.

When the responder slots field has a size of 2N+1 octet, octet 0 may designate the presence of a responder slot, octets 1 to N may designate allocated slots for responder DT-anchors (responder anchors) in the DST_MAC_ADDRESS list, and octets N+1 to 2N+1 may designate the second allocated slot for responder DT-anchors (responder anchors) in the DST_MAC_ADDRESS list. In this case, the slots designated in octets 1 to N may be used for responder anchors to transmit the first response message (e.g., the second UWB message in FIGS. 9 and 10), and the slots designated in octets N+1 to 2N+1 may be used for responder anchors to transmit the second response message (e.g., the fourth UWB message in FIGS. 9 and 10).

The DST_MAC_ADDRESS field may include a DST_MAC_ADDRESS list for a designated ranging round. The DST_MAC_ADDRESS list may include MAC addresses of anchors participating as responder anchors in a designated ranging round.

Figure 15:
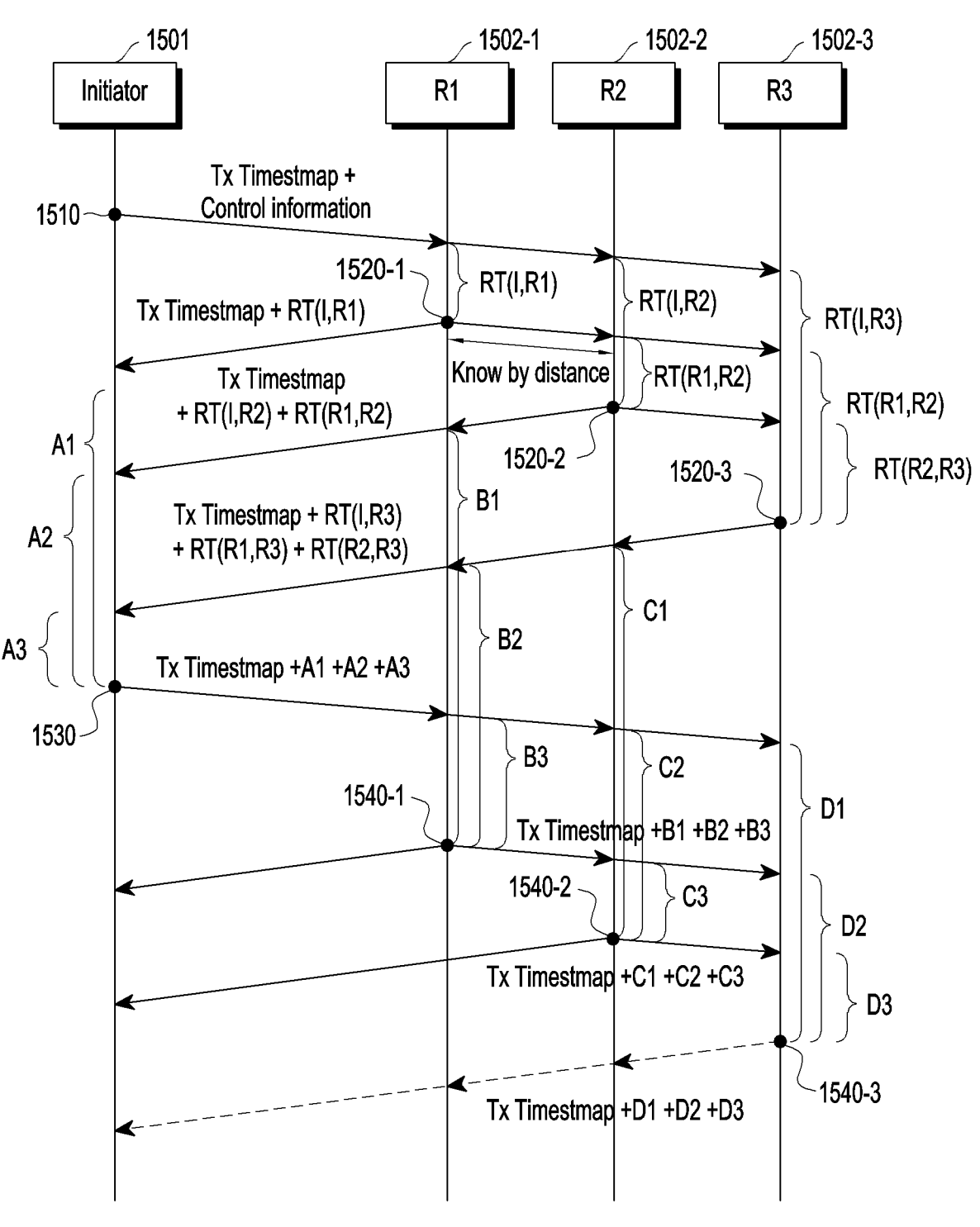
FIG. 15 illustrates a method for anchors to transfer reply time information in a ranging procedure according to an embodiment of the disclosure.

FIG. 15 illustrates a method for anchors to transfer reply time information in a ranging procedure according to an embodiment of the disclosure.

The ranging procedure of the embodiment of FIG. 15 may be an example of the ranging procedure of FIGS. 9 and 10. A description of the ranging procedure of the embodiment of FIG. 15 may refer to the description of the ranging procedure of FIGS. 9 and 10.

In the embodiment of FIG. 15, each anchor may transmit two UWB messages (DTMs).

In the embodiment of FIG. 15, for convenience of description, it is assumed that four anchors including one initiator anchor 1501 and three responder anchors 1502-1 to 1502-3 perform a ranging procedure, but embodiments are not limited thereto. For example, a different number of anchors than those illustrated may participate in the ranging procedure.

Referring to FIG. 15, in operation 1510, the initiator anchor 1501 may transmit or broadcast a first UWB message (I) (e.g., the first UWB message of FIGS. 9 and 10) to initiate a ranging procedure.

In operation 1520-1, the first responder anchor 1502-1 may transmit or broadcast a second UWB message R1 (e.g., the second UWB message of FIGS. 9 and 10) in response to the first UWB message I. The second UWB message R1 of the first responder anchor 1502-1 may include one reply time information (RT(I,R1)) as follows.

RT(I,R1): Indicates the elapsed time between the time when the first UWB message I is received and the time when the second UWB message R1 is transmitted.

As an embodiment, RT(I,R1) may be included in the payload IE (e.g., payload IE 1120-2 of FIG. 11 or payload IE 1120-2 of FIGS. 12A and 12B) for DL-TdoA in its second UWB message R1.

In operation 1520-2, the second responder anchor 1502-2 may transmit or broadcast a second UWB message R2 (e.g., the second UWB message of FIGS. 9 and 10) in response to the first UWB message I. The second UWB message R2 of the second responder anchor 1502-2 may include two reply time information (RT(I,R1) and RT(R1,R2)) as follows.

RT(I,R2): Indicates the elapsed time between the time when the first UWB message I is received and the time when the second UWB message R2 is transmitted.

RT(R1,R2): Indicates the elapsed time between the time when the second UWB message R1 of the first responder anchor 1502-1 is received and the time when the second UWB message R2 is transmitted.

As an embodiment, RT(I,R1) and/or RT(R1,R2) may be included in the payload IE (e.g., payload IE 1120-2 of FIG. 11 or payload IE 1120-2 of FIGS. 12A and 12B) for DL-TDoA in its second UWB message R2.

In operation 1520-3, the third responder anchor 1502-3 may transmit or broadcast a second UWB message R3 (e.g., the second UWB message of FIGS. 9 and 10) in response to the first UWB message I. The second UWB message R3 of the second responder anchor 1502-2 may include three reply time information (RT(I,R3), RT(R1,R3), and RT(R2,R3)) as follows.

RT(I,R3): Indicates the elapsed time between the time when the first UWB message I is received and the time when the second UWB message R3 is transmitted.

RT(R1,R3): Indicates the elapsed time between the time when the second UWB message R1 of the first responder anchor 1502-1 is received and the time when the second UWB message R3 is transmitted.

RT(R2,R3): Indicates the elapsed time between the time when the second UWB message R2 of the second responder anchor 1502-2 is received and the time when the second UWB message R3 is transmitted.

As an embodiment, RT(I,R3), RT(R1,R3), and/or RT(R2, R3) may be included in the payload IE (e.g., the payload IE 1120-2 of FIG. 11 or the payload IE 1120-2 of FIGS. 12A and 12B) for DL-TDoA in its second UWB message R3.

In operation 1530, the initiator anchor 1501 may transmit or broadcast a third UWB message (e.g., the third UWB message of FIGS. 9 and 10) in response to the second UWB messages from the responder anchors 1502-1, 1502-2, and 1502-3. The third UWB message of the initiator anchor 1501 may include three reply time information A1, A2, and A3 as follows.

A1: Indicates the elapsed time between the time when the second UWB message R1 of the first responder anchor 1502-1 is received and the time when its third UWB message is transmitted.

A2: Indicates the elapsed time between the time the second UWB message R2 of the second responder anchor 1502-2 is received and the time when its third UWB message is transmitted.

A3: Indicates the elapsed time between the time when the second UWB message R3 of the third responder anchor 1502-3 is received and the time when its third UWB message is transmitted.

As an embodiment, A1, A2, and/or A3 may be included in the payload IE (e.g., payload IE 1120-2 of FIG. 11 or payload IE 1220-2 of FIGS. 12A and 12B) for DL-TDoA in its third UWB message.

In operation 1540-1, the first responder anchor 1502-1 may transmit or broadcast a fourth UWB message (e.g., the fourth UWB message of FIGS. 9 and 10) in response to the third UWB message. The fourth UWB message of the first responder anchor 1502-1 may include three reply time information A1, A2, and A3 as follows.

B1: Indicates the elapsed time between the time the second UWB message R2 of the second responder anchor 1502-2 is received and the time when its fourth UWB message is transmitted.

B2: Indicates the elapsed time between the time when the second UWB message R3 of the third responder anchor 1502-3 is received and the time when its fourth UWB message is transmitted.

B3: Indicates the elapsed time between the time when the third UWB message is received and the time when the fourth UWB message is transmitted.

As an embodiment, B1, B2, and/or B3 may be included in the payload IE (e.g., payload IE 1120-2 of FIG. 11 or payload IE 1220-2 of FIGS. 12A and 12B) for DL-TDoA in its fourth UWB message.

In operation 1540-2, the second responder anchor 1502-2 may transmit or broadcast a fourth UWB message (e.g., the fourth UWB message of FIGS. 9 and 10) in response to the third UWB message. The fourth UWB message of the second responder anchor 1502-2 may include three reply time information C1, C2, and C3 as follows.

C1: Indicates the elapsed time between the time when the second UWB message R3 of the third responder anchor 1502-3 is received and the time when its fourth UWB message is transmitted.

C2: Indicates the elapsed time between the time when the third UWB message is received and the time when the fourth UWB message is transmitted.

C3: Indicates the elapsed time between the time when the fourth UWB message of the first responder anchor 1502-1 is received and the time when its fourth UWB message is transmitted.

As an embodiment, C1, C2, and/or C3 may be included in the payload IE (e.g., payload IE 1120-2 of FIG. 11 or payload IE 1220-2 of FIGS. 12A and 12B) for DL-TDoA in its fourth UWB message.

In operation 1540-3, the third responder anchor 1502-3 may transmit or broadcast a fourth UWB message (e.g., the fourth UWB message of FIGS. 9 and 10) in response to the third UWB message. The fourth UWB message of the third responder anchor 1502-3 may include three reply time information D1, D2, and D3 as follows.

D1: Indicates the elapsed time between the time when the third UWB message is received and the time when the fourth UWB message is transmitted.

D2: Indicates the elapsed time between the time when the third UWB message of the first responder anchor 1502-1 is received and the time when its fourth UWB message is transmitted.

D3: Indicates the elapsed time between the time when the third UWB message of the second responder anchor 1502-2 is received and the time when its fourth UWB message is transmitted.

As an embodiment, D1, D2, and/or D3 may be included in the payload IE (e.g., payload IE 1120-2 of FIG. 11 or payload IE 1220-2 of FIGS. 12A and 12B) for DL-TDoA in its fourth UWB message.

As such, each anchor may include the whole or part of the reply time information for each UWB received before its UWB message is received in its UWB message and transmit it. The so-transmitted reply time information may be used for CFO correction. An example of CFO correction using reply time information is described below with reference to FIGS. 16A to 16C.

Figure 16A:
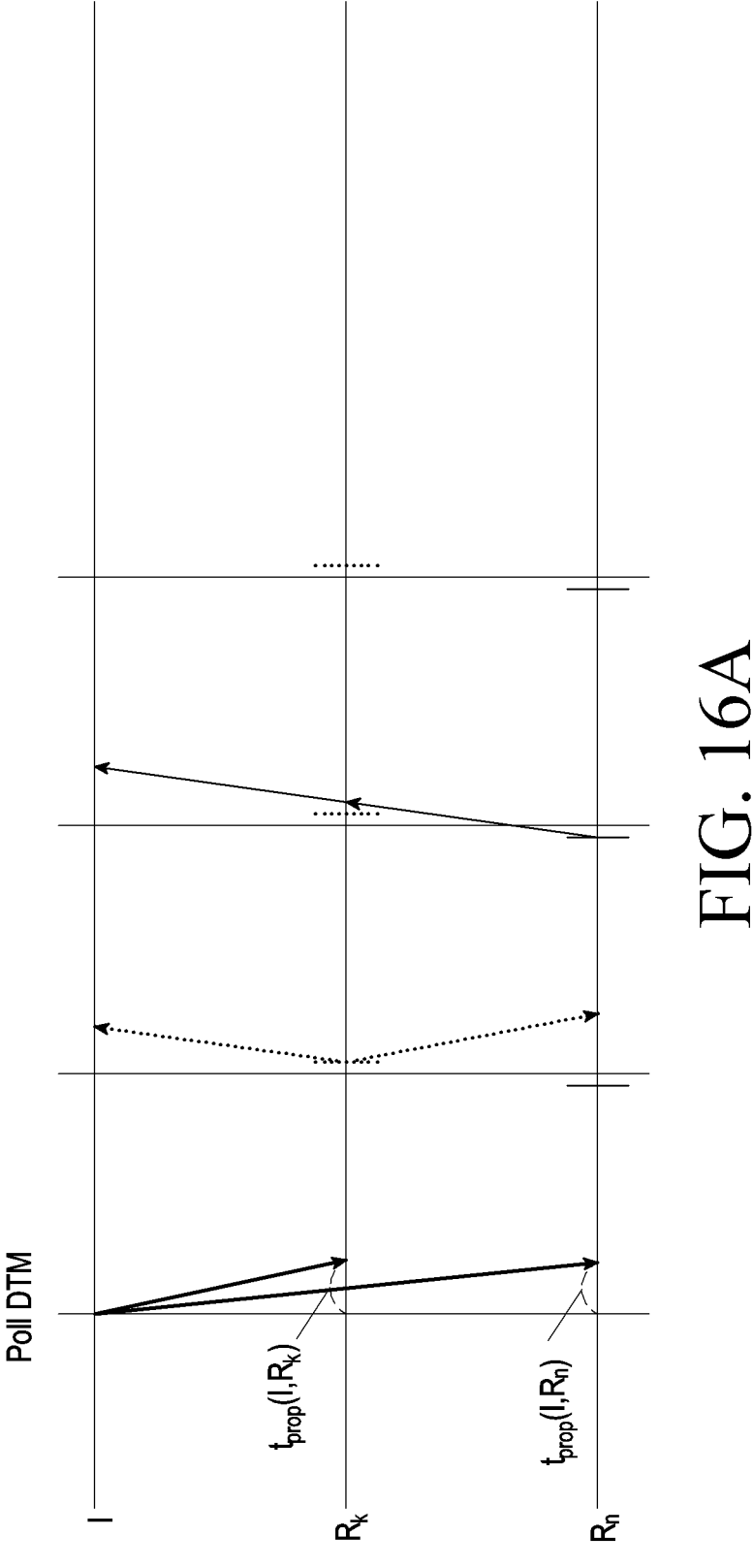
FIG. 16A illustrates a situation in which an initiator anchor transmits a first UWB message and responder anchors transmit a second UWB message in response to the first UWB message according to an embodiment of the disclosure.

FIG. 16A illustrates a situation in which an initiator anchor transmits a first UWB message and responder anchors transmit a second UWB message in response to the first UWB message according to an embodiment of the disclosure.

Referring to FIGS. 16A to 6C, each responder anchor ($R_k$, $R_n$), receiving a first UWB message (poll DTM, first DTM)

from an initiator anchor I, may transmit a second UWB message (response DTM, second DTM) in its allocated ranging slot obtained based on the first UWB message.

As illustrated, since the distance between the initiator anchor I and $R_k$ responder anchor differs from the distance between the initiator anchor I and $R_n$ responder anchor, the times (propagation times) when the first DTM arrives at the two responder anchors may differ. The arrival times may be represented as $t_{prop}(I, R_k)$ and $t_{prop}(I, R_n)$, respectively.

$t_{prop}(I, R_k)$: Time when the first DTM of the initiator anchor (I) arrives at the $R_k$ anchor $t_{prop}(I, R_n)$: Time when the first DTM of the initiator anchor (I) arrives at the $R_n$ anchor In consideration of this phenomenon, the following embodiment regards a method in which the responder anchor synchronizes the start time of the first ranging slot of the ranging round with the initiator anchor. <Embodiment for synchronizing the start time of the first ranging slot of the ranging round>

First embodiment: Method in which responder DT-anchor ($R_k$, $R_n$) adjusts the start time of ranging slot 0 by subtracting $t_{prop}$ from the time of reception of the poll DTM (first DTM) sent by initiator DT-anchor (I).

However, even when the responder anchors adjust the start time of ranging slot 0 according to the above-described method, each anchor may differently determine the start times of ranging slot 1 and ranging slot 2 due to the clock drift effect of the crystal oscillator of the UWB chip (UWBS) in the two anchors.

Figure 16B:
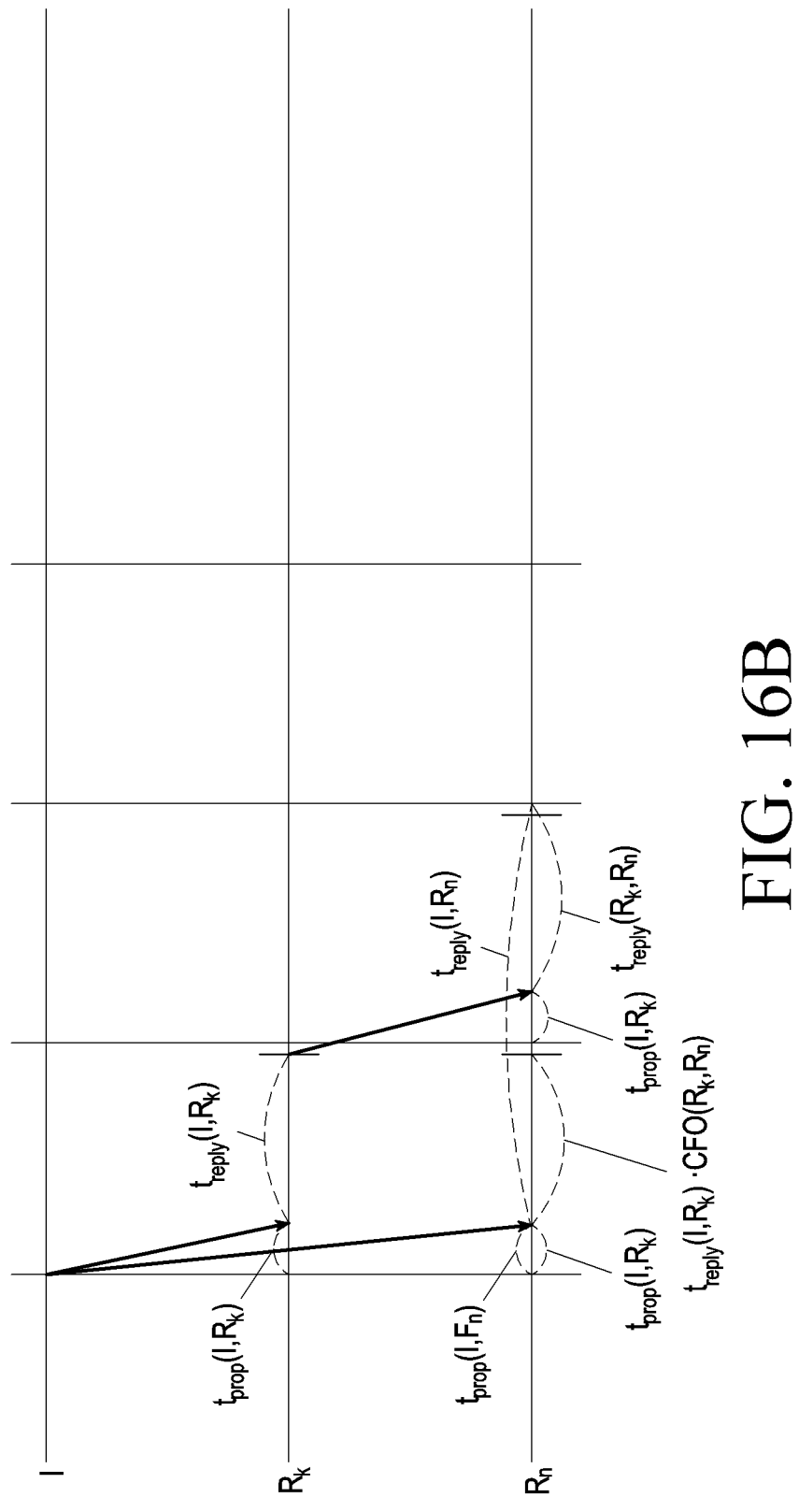
FIG. 16B is a view illustrating an equation for estimating, at a user equipment (UE) side, a reply time for another responder anchor to which a specific responder anchor previously responded, according to an embodiment of the disclosure.

FIG. 16B is a view illustrating an equation for estimating, at a UE side, a reply time for another responder anchor to which a specific responder anchor previously responded, according to an embodiment of the disclosure.

Equation 1 below is an equivalent expression of two equations capable of estimating the start time of ranging slot 2 (i.e., the time when the $R_n$ responder anchor transmits the second DTM) in the UE when the initiator anchor transmits the first UWB message (the first DTM, the poll DTM) in ranging slot 0 and the $R_n$ responder anchor transmits its second UWB message (the second DTM, the response DTM) in ranging slot 2.

$$t_{prop}(I,R_n)+t_{reply}(I,R_n)=t_{prop}(I,R_k)+t_{reply}(I,R_k)\cdot CFO(R_k, R_n)+t_{prop}(R_k,R_n)+t_{reply}(R_k,R_n) \qquad \text{Equation 1}$$

The left term of Equation 1 above expresses the sum of $t_{prop}(I, R_n)$, which is the time taken for the first DTM transmitted by the initiator anchor to reach the $R_n$ responder anchor, and $t_{reply}(I, R_n)$, which is the reply time that the responder anchor will include in its second DTM. This may be expressed as a difference in transmission time between the first DTM transmitted by the initiator anchor and the second DTM transmitted by the $R_n$ responder anchor, or theoretically, a difference in time between two ranging slots.

The right term of Equation 1 above is the sum of $t_{prop}(I, R_k)$, which is the time taken for the first DTM transmitted by the initiator anchor to reach the $R_k$ responder anchor, and $t_{reply}(I, R_k)$, which is the reply time that the responder anchor will include in its second DTM, and the sum of $t_{prop}(R_k, R_n)$, which is the time taken for the second DTM of the $R_k$ responder anchor to reach the $R_n$ responder anchor, and $t_{reply}(R_k, R_n)$, which may be the time when the $R_n$ responder anchor may respond to the second DTM sent by the $R_k$ responder anchor. In this case, since $t_{reply}(I, R_k)$ is a value calculated by the $R_k$ responder anchor, it is necessary to multiply by $CFO(R_k, R_n)$ which is the ratio of the clock frequency offset between the $R_k$ responder anchor and the $R_n$ responder anchor and convert it into the value measured by the clock of the $R_n$ responder anchor so that the above Equations 1 and 2 may be regarded as identical.

By moving the term of the above equation, it is possible to calculate $t_{reply}(R_k, R_n)$, which may be the time when the $R_n$ responder anchor may respond to the second DTM sent by the $R_k$ responder anchor.

In an embodiment, $t_{reply}(R_k, R_n)$ may be a value that responder anchors may directly calculate reply times for other responder anchors transmitted in ranging slots ahead of their responder anchors and include in the second DTMs that they transmit. However, in this case, since additional implementations are required for responder anchors for this calculation, implementation complexity for responder anchors may increase.

In an embodiment, $t_{reply}(R_k, R_n)$ may be estimated by the UE (tag). In this case, no additional implementation is required in the responder anchors for this calculation, so that implementation complexity for responder anchors is not increased.

$$t_{reply}(R_k,R_n)=t_{prop}(I,R_n)-t_{prop}(I,R_k)-t_{prop}(R_k,R_n)+t_{reply}(I,R_n)-t_{reply}(I,R_k)\cdot CFO(R_k,R_n) \qquad \text{Equation 2}$$

$t_{prop}$, which is the propagation time between anchors, may be obtained by obtaining the distance through the coordinates of two anchors and dividing the distance by the speed of light or by using the distance between anchors if the first DTM or the second DTM includes the distance. Since $t_{reply}(I, R_n)$ and $t_{reply}(I, R_k)$ are values included in the second DTM, the values may be obtained by receiving the second DTM. $CFO(R_k, R_n)$ is the clock drift offset between two responder anchors, which may be obtained using $CFO(I, R_n)$ and $CFO(I, R_k)$, and the two values are also included in the second DTM. Further, $CFO(R_k, R_n)$ may be obtained by using $CFO(\text{차이}, R_n)$ obtained by the UE through the difference in reception time and difference in transmission time between the two second DTMs received from the $R_n$ responder anchor and $CFO(\text{차이}, R_k)$ obtained the difference in reception time and difference in transmission time between the two second DTMs received from the $R_k$ responder anchor.

Figure 16C:
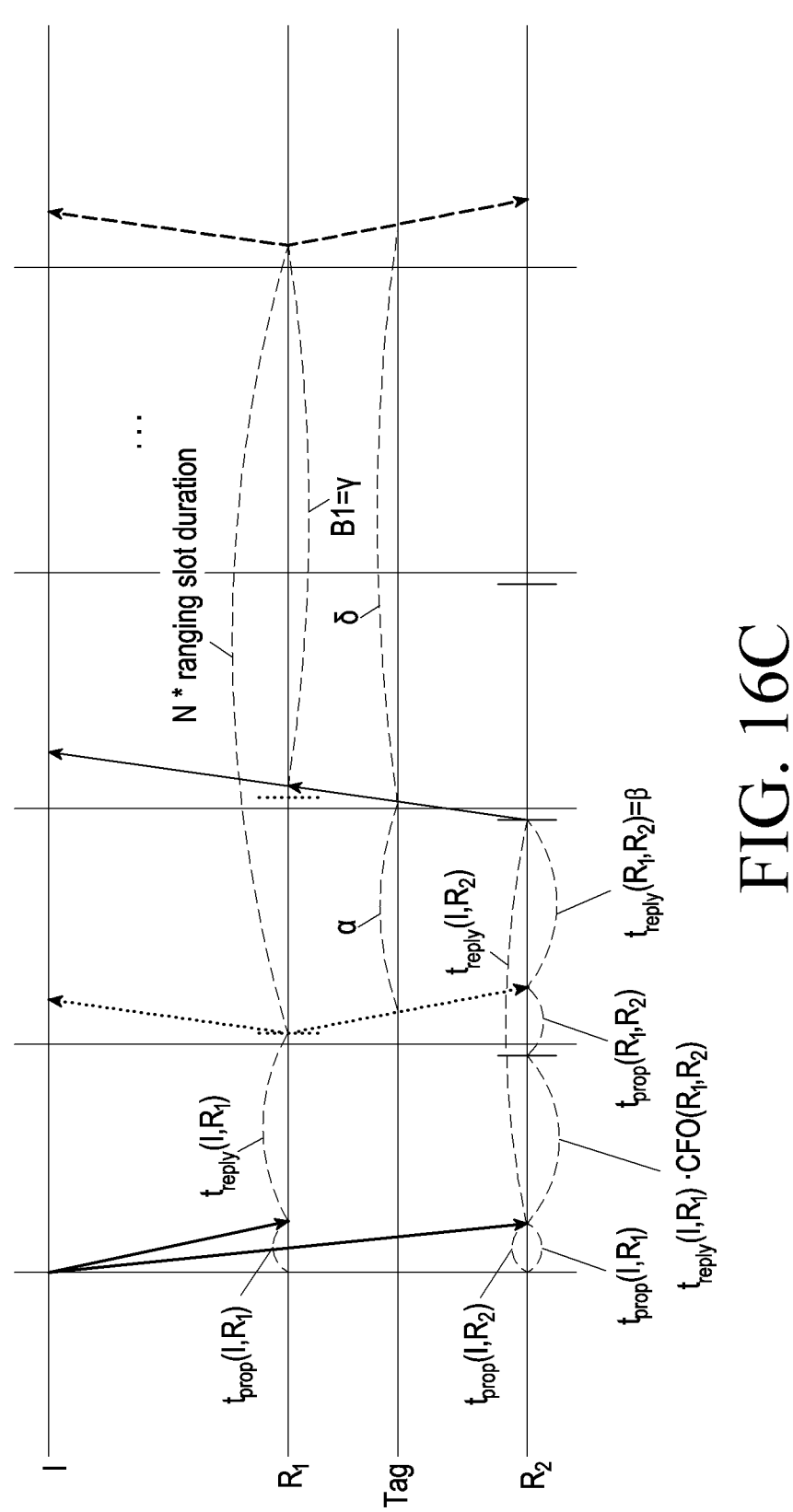
FIG. 16C is a view illustrating an equation for a UE to additionally obtain a TDoA by utilizing a reply time between responder anchors estimated by FIG. 16B according to an embodiment of the disclosure.

FIG. 16C is a view illustrating an equation for a UE to additionally obtain a TDoA by utilizing a reply time between responder anchors estimated by FIG. 16B according to an embodiment of the disclosure.

Referring to FIG. 16C, the UE (tag) may obtain TDoAs for the second messages from the R1 responder anchor and the R2 responder anchor as follows.

$$2 \cdot TDoA = \alpha - \delta - \beta + \gamma \qquad \text{Equation 3}$$

$$2 \cdot TDoA = \alpha - (N * \text{ranging slot duration} \cdot CFO(R_1, \text{tag}) - \alpha) - \qquad \text{Equation 4}$$
$$\left(t_{reply}(R_1, R_2) \cdot CFO(R_2, \text{tag}) + (N \cdot \text{ranging slot duration} - \right.$$
$$\left. t_{reply}(R_1, R_2) \cdot CFO(R_2, R_1) - 2 \cdot t_{prop(R_1,R_2)}\right) \cdot CFO(R_1, \text{tag}))$$

$$TDoA = \frac{1}{2}\{2\alpha - t_{reply}(R_1, R_2) \cdot CFO(R_2, \text{tag}) - \qquad \text{Equation 5}$$
$$\left(t_{reply}(R_1, R_2) \cdot CFO(R_2, R_1) + 2 \cdot t_{prop(R_1,R_2)}\right) \cdot CFO(R_1, \text{tag})\}$$

TABLE 3

| Local time | Local clock | CFO used to convert to tag's local time |
|---|---|---|
| $\delta$   $N *$ ranging slot duration $\cdot CFO(R_1, \text{tag}) - \alpha$ | Tag | 1 |
| $\beta$   $t_{reply}(R_1, R_2)$ | R2 | $CFO(R_2, \text{tag})$ |
| $\gamma$   $N \cdot$ ranging slot duration $- t_{reply}(R_1, R_2) \cdot CFO(R_2, R_1) - 2 \cdot t_{prop(R_1,R_2)}$ | R1 | $CFO(R_1, \text{tag})$ |

According to Equation 5 above, the TDoA for two arbitrary responder anchors may be obtained. In this case, the reply time of the responder anchor for the second DTM of another responder anchor may be calculated through Equation 2 of FIG. 16B.

Meanwhile, in the conventional DL-TDoA positioning scheme, the UE may only obtain the TDoA for the signal of the initiator anchor and the signal of another responder anchor. However, when the ranging procedure of FIGS. 9 and 10 described above is followed, the TDoA for two arbitrary responder anchors may also be obtained in the manner referring to FIG. 16C, so that the UE may increase the chance of successful positioning through more TDoAs secured.

Figure 17:
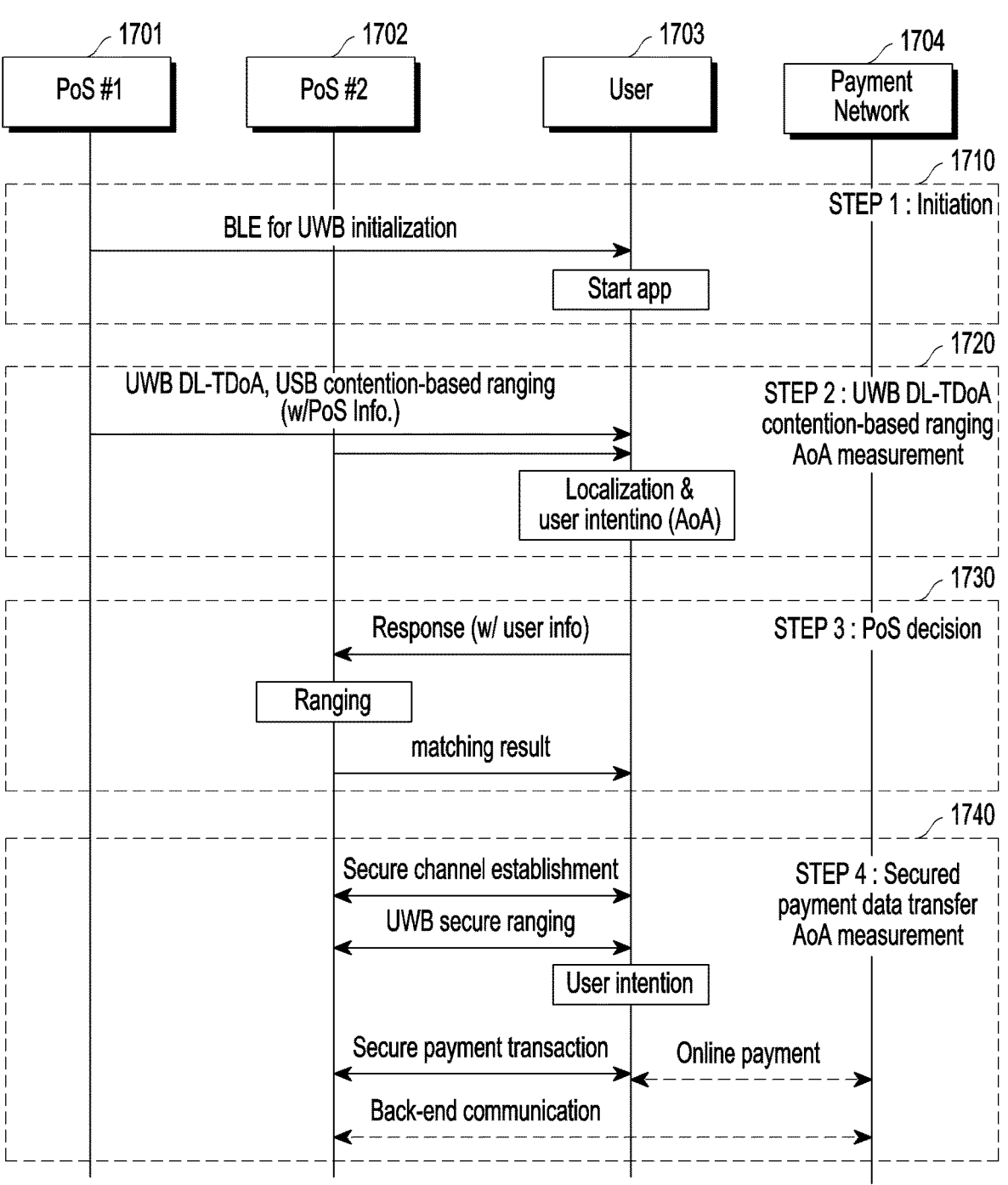
FIG. 17 illustrates a payment processing method using UWB according to an embodiment of the disclosure.

FIG. 17 illustrates a payment processing method using UWB according to an embodiment of the disclosure.

The payment processing method using UWB of FIG. 17 may be an example of the payment processing method using UWB of FIG. 8. In FIG. 17, the above description of FIG. 8 is omitted.

Referring to FIG. 17, the payment processing method using UWB may include a first operation 1710, a second operation 1720, a third operation 1730 and/or a fourth operation 1740. However, according to an embodiment, some steps (or some operations in the steps) may be omitted, a plurality of steps may be merged into one step, or additional steps may be further performed. Further, the steps (or operations in each step) may be performed in an order different from the order shown.

First Operation 1710

The first step is an initiation step, and may include an operation in which a first payment terminal 1701 transmits a BLE advertisement packet. When the BLE advertisement packet is received, the UE 1703 may start a UWB-enabled payment application.

Second Operation 1720

The second step may include performing UWB DL-TDoA/UWB contention-based ranging (e.g., 811/813 of FIG. 8) and/or performing AoA measurement (e.g., 813 of FIG. 8).

In the second step, the payment terminals 1701 and 1702 may transmit UWB messages for UWB DL-TDoA and UWB contention-based ranging. As an embodiment, the UWB messages for UWB DL-TDoA and UWB contention-based ranging may include payment terminal information (e.g., PoS information).

In step 2, the UE 1703 may receive UWB messages, perform DL-TDoA-based localization based on the received UWB messages, and perform AoA measurement. Through AoA measurement, the UE 1703 may identify user intent.

Third Operation 1730

The third step may be a step for determining a payment terminal.

In the third step, the UE 1703 may determine a payment terminal 1702 and transmit a response message for UWB contention-based ranging to the determined payment terminal 1702. As an embodiment, the response message may include information about the UE 1703.

In the third step, the payment terminal 1702 may perform ranging based on SS-TWR based on the response message of the UE 1703. The payment terminal 1702 may transmit a matching result to the UE 1703 based on ranging.
Fourth Operation 1740

The fourth step may be a step for securing and transmitting payment-related data between the matched/connected payment terminal 1702 and UE 1703 through the third operation 1730.

In the fourth step, a secure channel may be established between the payment terminal 1702 and the UE 1703.

In the fourth step, secure ranging may be performed between the payment terminal 1702 and the UE 1703.

In the fourth step, the UE 1703 may identify the user intention based on a result of secure ranging.

In the fourth step, the payment terminal 1702 and the UE 1703 may perform secure payment transactions through a payment network 1704 providing online payment and back-end communication.

Figure 18:
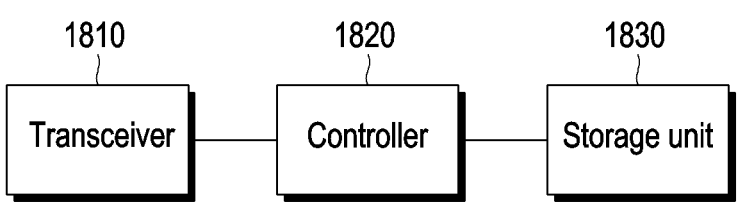
FIG. 18 illustrates a structure of a first UWB device according to an embodiment of the disclosure.

FIG. 18 illustrates a structure of a first UWB device according to an embodiment of the disclosure.

In the embodiment of FIG. 18, the first UWB device may correspond to the UWB device of FIG. 1, include a UWB device, or may be an electronic device that may include a portion of a UWB device. The first UWB device may be, e.g., an anchor (e.g., an initiator anchor/responder anchor) for a UWB-based payment service.

Referring to FIG. 18, the first UWB device may include a transceiver 1810, a controller 1820, and a storage unit 1830. In the disclosure, the controller may be defined as a circuit or application-specific integrated circuit or at least one processor.

The transceiver 1810 may transmit and receive signals to/from another entity.

The controller 1820 may control the overall operation of the electronic device according to an embodiment. For example, the controller 1820 may control inter-block signal flow to perform the operations according to the above-described flowchart. Specifically, the controller 1820 may control, e.g., the operations (e.g., the operations of the anchor for the UWB-based payment service) of the first UWB device described above with reference to FIGS. 1 to 4, 5A, 5B, 6, 7A, 7B, 8 to 11, 12A, 12B, 13A, 13B, 14, 15, 16A to 16C, and 17.

The storage unit 1830 may store at least one of information transmitted/received via the transceiver 1810 and information generated via the controller 1820. For example, the storage unit 1830 may store information and data necessary for the method described above with reference to FIGS. 1 to 4, 5A, 5B, 6, 7A, 7B, 8 to 11, 12A, 12B, 13A, 13B, 14, 15, 16A to 16C, and 17.

Figure 19:
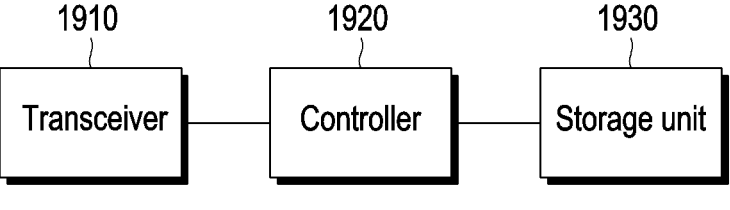
FIG. 19 illustrates a structure of a second UWB device according to an embodiment of the disclosure.

FIG. 19 illustrates a structure of a second UWB device according to an embodiment of the disclosure.

In the embodiment of FIG. 19, the first UWB device may correspond to the UWB device of FIG. 2, include a UWB device, or may be an electronic device that may include a portion of a UWB device. The second UWB device may be, e.g., a UE for UWB-based payment service.

Referring to FIG. 19, the second UWB device may include a transceiver 1910, a controller 1920, and a storage unit 1930. In the disclosure, the controller may be defined as a circuit or application-specific integrated circuit or at least one processor.

The transceiver 1910 may transmit and receive signals to/from another entity. The controller 1920 may be embodied as one or more of various processing devices, such as a coprocessor, a microprocessor, a digital signal processor (DSP), a processing circuitry with or without an accompanying DSP, or various other processing devices including, a microcontroller unit (MCU), a hardware accelerator, a special-purpose computer chip, or the like. The storage unit 1930 may include one or more volatile or non-volatile memories, or a combination thereof. For example, the storage unit 1930 may be embodied as semiconductor memories, such as flash memory, mask read only memory (ROM), programmable ROM (PROM), erasable PROM (EPROM), random access memory (RAM), etc. and the like.

The controller 1920 may control the overall operation of the electronic device according to an embodiment. For example, the controller 1920 may control inter-block signal flow to perform the operations according to the above-described flowchart. Specifically, the controller 1920 may control, e.g., the operations (e.g., the operations of the UE for the UWB-based payment service) of the second UWB device described above with reference to FIGS. 1 to 4, 5A, 5B, 6, 7A, 7B, 8 to 11, 12A, 12B, 13A, 13B, 14, 15, 16A to 16C, and 17.

As an embodiment, the controller 1920 may be configured to receive, from an initiator anchor, a first UWB message initiating a ranging procedure, receive, from a plurality of responder anchors, a plurality of second UWB messages transmitted in response to the first UWB message, receive, from the initiator anchor, a third UWB message transmitted in response to the second UWB message, and receive, from the plurality of responder anchors, a plurality of fourth UWB messages transmitted in response to the third UWB message.

As an embodiment, the controller 1920 may be fragmented transmission perform DL-TDoA-based localization based on the first UWB message, the second UWB message, the third UWB message, and the fourth UWB message.

As an embodiment, the first UWB message may include first information for DL-TDoA and second information for contention-based ranging.

As an embodiment, the first information for DL-TDoA may include first scheduling information and second scheduling information for each of the plurality of responder anchors. The first scheduling information may designate a ranging slot used by a corresponding responder anchor to transmit its second UWB message. The second scheduling information may designate a ranging slot used by a corresponding responder anchor to transmit its fourth UWB message.

As an embodiment, the second information for contention-based ranging may include information designating a size of a contention access period.

As an embodiment, the controller may be further configured to select one anchor from among the initiator anchor and the plurality of responder anchors based on a result of the DL-TDoA-based localization.

As an embodiment, the controller may be further configured to transmit a ranging response message for SS-TWR to the anchor selected from among the initiator anchor and the plurality of responder anchors in an arbitrary slot in the contention access period.

As an embodiment, the SS-TWR may include information used for mutual authentication between the UWB device and the selected anchor.

As an embodiment, the fourth UWB message may include third information for DL-TDoA and fourth information for contention-based ranging. The third information for DL-TDoA may include first reply time information designating a reply time between a time of reception of the third UWB message and a time of transmission of the fourth UWB message and second reply time information designating a reply time between a time of reception of the second UWB message from another responder anchor and a time of transmission of the fourth UWB message.

The storage unit 1930 may store at least one of information transmitted/received via the transceiver 1910 and information generated via the controller 1920. For example, the storage unit 1930 may store information and data necessary for the method described above with reference to FIGS. 1 to 4, 5A, 5B, 6, 7A, 7B, 8 to 11, 12A, 12B, 13A, 13B, 14, 15, 16A to 16C, and 17.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by an ultra-wide band (UWB) device, the method comprising:
   receiving, from an initiator anchor, a first UWB message initiating a ranging procedure, wherein the first UWB message includes first information for downlink time difference of arrival (DL-TDoA) and second information for a contention-based ranging;
   receiving, from a plurality of responder anchors, a plurality of second UWB messages based on the first information;
   receiving, from the initiator anchor, a third UWB message;
   receiving, from the plurality of responder anchors, a plurality of fourth UWB messages; and
   determining location based on the first UWB message, the plurality of second UWB messages, the third UWB message, and the plurality of fourth UWB messages,
   wherein the first information for DL-TDoA includes first scheduling information and second scheduling information for each of the plurality of responder anchors,
   wherein the first scheduling information indicates a ranging slot used by a corresponding responder anchor to transmit its second UWB message, and
   wherein the second scheduling information indicates a ranging slot used by a corresponding responder anchor to transmit its fourth UWB message.

2. The method of claim 1, wherein the second information for contention-based ranging includes information indicating a size of a contention access period.

3. The method of claim 1, further comprising:
   selecting an anchor from among the initiator anchor and the plurality of responder anchors based on the determined location.

4. The method of claim 3, further comprising:
   transmitting a ranging response message for single-sided two-way ranging (SS-TWR) to the selected anchor from among the initiator anchor and the plurality of responder anchors in a slot in a contention access period.

5. The method of claim 4, wherein the ranging response message for the SS-TWR includes information used for mutual authentication between the UWB device and the selected anchor.

6. The method of claim 1,
   wherein each of the plurality of fourth UWB messages includes third information for DL-TDoA and fourth information for contention-based ranging, and
   wherein the third information for DL-TDoA includes first reply time information indicating a reply time between a time of reception of the third UWB message and a time of transmission of the fourth UWB message and second reply time information indicating a reply time between a time of reception of the second UWB message from another responder anchor and a time of transmission of the fourth UWB message.

7. The method of claim 1, further comprising:
   identifying a start point and a duration of the contention-based ranging based on the first information and the second information.

8. An ultra-wide band (UWB) device, comprising:
   a transceiver; and
   a controller coupled with the transceiver and configured to control to:
   receive, from an initiator anchor, a first UWB message initiating a ranging procedure, wherein the first UWB message includes first information for downlink time difference of arrival (DL-TDoA) and second information for a contention-based ranging,
   receive, from a plurality of responder anchors, a plurality of second UWB messages based on the first-information,
   receive, from the initiator anchor, a third UWB message,
   receive, from the plurality of responder anchors, a plurality of fourth UWB messages, and
   determine location based on the first UWB message, the plurality of second UWB messages, the third UWB message, and the plurality of fourth UWB messages,
   wherein the first information for DL-TDoA includes first scheduling information and second scheduling information for each of the plurality of responder anchors,
   wherein the first scheduling information indicates a ranging slot used by a corresponding responder anchor to transmit its second UWB message, and
   wherein the second scheduling information indicates a ranging slot used by a corresponding responder anchor to transmit its fourth UWB message.

9. The UWB device of claim 8, wherein the second information for contention-based ranging includes information indicating a size of a contention access period.

10. The UWB device of claim 8, wherein the controller is configured to:
   select an anchor from among the initiator anchor and the plurality of responder anchors based on the determined location.

11. The UWB device of claim 10, wherein the controller is configured to:
   transmit a ranging response message for SS-TWR to the selected anchor from among the initiator anchor and the plurality of responder anchors in a slot in a contention access period.

12. The UWB device of claim 11, wherein the ranging response message for the SS-TWR includes information used for mutual authentication between the UWB device and the selected anchor.

13. The UWB device of claim 8, wherein each of the plurality of fourth UWB messages includes third information for DL-TDoA and fourth information for contention-based ranging, and wherein the third information for DL-TDoA includes first reply time information indicating a reply time between a time of reception of the third UWB message and a time of transmission of the fourth UWB message and second reply time information indicating a reply time between a time of reception of the second UWB message from another responder anchor and a time of transmission of the fourth UWB message.

14. The UWB device of claim 8, wherein the controller is further configured to:

identify a start point and a duration of the contention-based ranging based on the first information and the second information.

15. A non-transitory computer-readable storage medium with an executable program stored thereon, wherein the program instructs a microprocessor of an ultra-wide band (UWB) device to perform the following steps:

receiving, from an initiator anchor, a first UWB message initiating a ranging procedure, wherein the first UWB message includes first information for downlink time difference of arrival (DL-TDoA) and second information for a contention-based ranging;

receiving, from a plurality of responder anchors, a plurality of second UWB messages based on the first information;

receiving, from the initiator anchor, a third UWB message;

receiving, from the plurality of responder anchors, a plurality of fourth UWB messages; and determining location based on the first UWB message, the plurality of second UWB messages, the third UWB message, and the plurality of fourth UWB messages, wherein the first information for DL-TDoA includes first scheduling information and second scheduling information for each of the plurality of responder anchors, wherein the first scheduling information indicates a ranging slot used by a corresponding responder anchor to transmit its second UWB message, and wherein the second scheduling information indicates a ranging slot used by a corresponding responder anchor to transmit its fourth UWB message.

16. The non-transitory computer-readable storage medium of claim 15, wherein the second information for contention-based ranging includes information indicating a size of a contention access period.

17. The non-transitory computer-readable storage medium of claim 15, wherein the program further instructs the microprocessor to perform the following step:

selecting an anchor from among the initiator anchor and the plurality of responder anchors based on the determined location.

18. The non-transitory computer-readable storage medium of claim 17, wherein the program further instructs the microprocessor to perform the following step:

transmitting a ranging response message for single-sided two-way ranging (SS-TWR) to the selected anchor from among the initiator anchor and the plurality of responder anchors in a slot in a contention access period.

19. The non-transitory computer-readable storage medium of claim 18, wherein the ranging response message for the SS-TWR includes information used for mutual authentication between the UWB device and the selected anchor.

20. The non-transitory computer-readable storage medium of claim 15, wherein the program further instructs the microprocessor to perform the following step:

identifying a start point and a duration of the contention-based ranging based on the first information and the second information.

* * * * *